US012262024B2

(12) United States Patent
Grois et al.

(10) Patent No.: US 12,262,024 B2
(45) Date of Patent: Mar. 25, 2025

(54) METHOD AND SYSTEMS FOR OPTIMIZED CONTENT ENCODING

(71) Applicant: Comcast Cable Communications, LLC, Philadelphia, PA (US)

(72) Inventors: Dan Grois, Beer-Sheva (IL); Alexander Giladi, Princeton, NJ (US); Yasser Syed, Philadelphia, PA (US); Ali Begen, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/490,997

(22) Filed: Sep. 30, 2021

(65) Prior Publication Data

US 2022/0103832 A1    Mar. 31, 2022

Related U.S. Application Data

(60) Provisional application No. 63/085,898, filed on Sep. 30, 2020.

(51) Int. Cl.
*H04N 19/147* (2014.01)
*H04N 19/132* (2014.01)
(Continued)

(52) U.S. Cl.
CPC ......... *H04N 19/147* (2014.11); *H04N 19/132* (2014.11); *H04N 19/172* (2014.11); *H04N 19/19* (2014.11)

(58) Field of Classification Search
CPC .. H04N 19/147; H04N 19/132; H04N 19/172; H04N 19/19; H04N 19/124;
(Continued)

(56) References Cited

U.S. PATENT DOCUMENTS

2010/0124275 A1* 5/2010 Yeh ................... H04N 21/658
                                                    375/240.07
2011/0090960 A1* 4/2011 Leontaris ............ H04N 19/194
                                                    375/240.18
(Continued)

OTHER PUBLICATIONS

Hannuksela, M. M. et al., "H.264/AVC in Wireless Environments," IEEE Transactions on Circuits and Systems for Video Technology, 2003, pp. 657-673, 13(7), IEEE.
(Continued)

*Primary Examiner* — Hesham K Abouzahra
(74) *Attorney, Agent, or Firm* — Ballard Spahr LLP

(57) ABSTRACT

An encoder (e.g., a Versatile Video Coding (VVC) encoder, etc.) may make real-time encoding decisions to vary a bitrate of a content item (e.g., high-resolution video, streaming content, a movie, a show/program, etc.) by upsampling and/or downsampling portions (e.g., frames/slices, group of pictures (GOP), coding units (CU), coding tree units (CTU), etc.) based on a cost function that utilizes a versatile Lagrangian multiplier (denoted as $\lambda_v$ to denote the versatility). The versatile Lagrangian multiplier may not only account for the effects of quantization (e.g., a quantization parameter (QP), etc.) on portions of the content item, instead, the versatile Lagrangian multiplier may also be based on adjustment parameters associated with content resolution and/or playback quality of experience (QoE). The versatile Lagrangian multiplier enables a substantial decrease in transmission bitrate for portions of a content item without reducing the visual presentation quality and keeping an end-user quality of experience (QoE) at an optimal level.

23 Claims, 12 Drawing Sheets

(51) Int. Cl.
*H04N 19/172* (2014.01)
*H04N 19/19* (2014.01)

(58) Field of Classification Search
CPC ......... H04N 21/23805; H04N 21/2402; H04N 19/152; H04N 19/166; H04N 19/164
See application file for complete search history.

(56) References Cited

U.S. PATENT DOCUMENTS

2012/0294355 A1* 11/2012 Holcomb ............. H04N 19/157
375/240.03
2016/0301931 A1* 10/2016 Wen ..................... H04N 19/192
2021/0092382 A1* 3/2021 Auyeung ............... H04N 19/91

OTHER PUBLICATIONS

Wang, W. et al., "Unified Quantization Parameter and Frame Size Control for Quality of Experience Optimization in Wireless Multimedia Communications," ACM, 2015, pp. 227-230.
Extended European Search Report issued in related application No. EP 21200093.9 mailed Mar. 28, 2022.

* cited by examiner

METHOD AND SYSTEMS FOR OPTIMIZED CONTENT ENCODING

CROSS-REFERENCE TO RELATED APPLICATIONS

This application claims the benefit of U.S. Provisional Application No. 63/085,898, filed Sep. 30, 2020, which is incorporated herein in its entirety.

BACKGROUND

Video technology and applications continue to evolve and gain traction in popularity. Commensurate with the evolution of video technology and applications is an increase in the amount of data contained in high-resolution videos such as Ultra-High Definition (UltraHD)/4K and/or the like and an increase in bandwidth requirements for transmitting/streaming such video. For example, there is expected to be a significant increase in the bandwidth requirements for transmitting/streaming high-resolution video by the year 2023. By 2023, it is expected that 66 percent of connected flat-panel TV and related devices will be configured for Ultra-UltraHD resolution compared to only 33 percent in 2018. Further, overall internet protocol (IP) video traffic is expected to grow to 82% of all Internet traffic by the year 2022. Therefore, there is a need to substantially decrease the transmission bitrate of high-resolution content items. Encoders are unable to decrease the transmission bitrate of high-resolution content items without reducing an overall visual presentation quality and/or affecting an end-user quality of experience (QoE).

SUMMARY

It is to be understood that both the following general description and the following detailed description are exemplary and explanatory only and are not restrictive. Methods and systems for optimized content encoding are described. An encoder (e.g., a video encoder, a content encoder, a Versatile Video Coding (VVC) encoder, etc.) may adaptively and/or dynamically (e.g., in real-time, etc.) encode (e.g., compress, modify, etc.) a content item (e.g., high-resolution video, streaming content, a movie, a show/program, etc.) to allocate a bitrate (e.g., upsample/upscale, downsample/downscale, etc.) to one or more portions (e.g., frames/slices, group of pictures (GOP), coding units (CU), coding tree units (CTU), etc.) of the content item. The encoder may encode one or more portions of the content item at varying bitrates, for example, based on one or more network conditions (e.g., bandwidth, throughput, data loss, etc.), one or more indications/notifications from a user device (e.g., a set-top box, a mobile device, a content player, a smart device, etc.), and/or the like. The encoder, based on a rate-distortion optimization (RDO process) that not only considers quantization, but also accounts for resolution and quality of experience (QoE), and/or the like, may encode one or more portions of the content item at varying bitrates. The encoder, based on accounting for resolution and quality of experience (QoE) during the RDO process, may maintain and/or enhance a playback (e.g., visual presentation, etc.) quality of the one or more portions of the content item, and/or cause an end-user quality of experience (QoE) to be at an optimal level.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the methods and systems.

DETAILED DESCRIPTION

Figure 1:
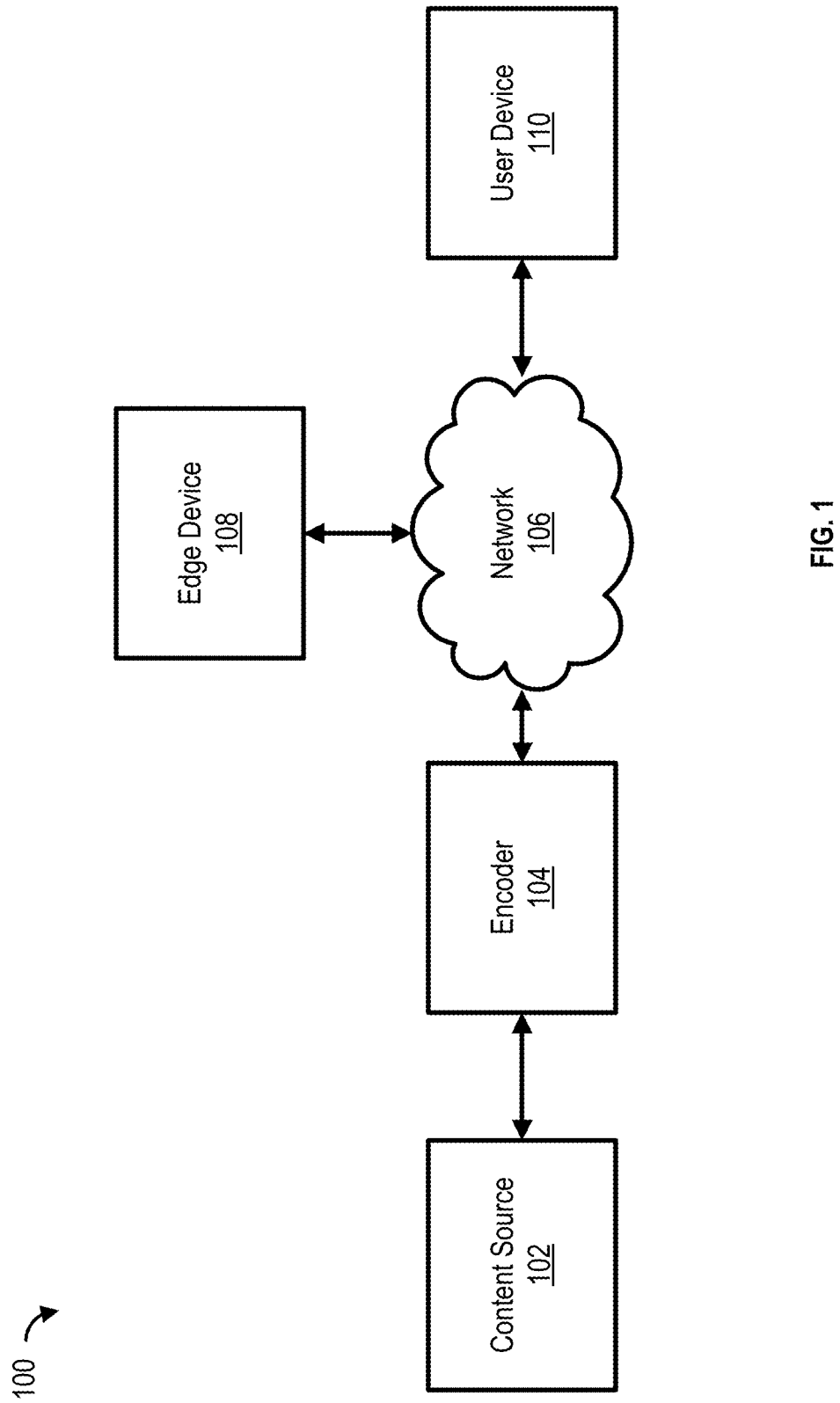
FIG. 1 shows a system for optimized content encoding.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers, or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application, reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text, and/or graphics, which may be but is not limited to electronic representations of videos, movies, or other multimedia, which may be but is not limited to data files adhering to H.364/MPEG-AVC, H.265/MPEG-HEVC, H.266/MPEG-VVC, MPEG-5 EVC, MPEG-5 LCEVC, AV1, MPEG2, MPEG, MPEG4 UHD, SDR, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.364, Nielsen watermarks, V-chip data and Secondary Audio Programs (SAP), Sound Document (.ASND) format, and/or any other format configured to store electronic audio whether such format is presently known or developed in the future. Content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

An encoder (e.g., a video encoder, a content encoder, a Versatile Video Coding (VVC) encoder, etc.) may adaptively and/or dynamically (e.g., in real-time, etc.) encode (e.g., compress, modify, etc.) a content item (e.g., high-resolution video, streaming content, a movie, a show/program, etc.) to allocate (e.g., assign, upsample/upscale, downsample/downscale, etc.) a bitrate to one or more portions (e.g., frames/slices, group of pictures (GOP), coding units (CU), coding tree units (CTU), etc.) of the content item. The playback quality of the content item may be affected by the encoding/compression method/technique used by the encoder, such as rate-distortion optimization and/or any other lossy compression method/technique. The playback quality of the content item may be further affected by one or more conditions associated with a user device (e.g., a set-top box, a mobile device, a content player, a smart device, etc.), such as an overflow/underflow buffer condition that causes jittery images/video, paused images/video, blurred images/video, artifacts, and/or any other type of distortion of the content item. For example, the encoder may, while a user device is receiving (e.g., streaming, etc.) a portion of a content item, encode/compress the content item to adjust to a varying network condition (e.g., bandwidth, throughput, packet loss, etc.). The encoder may encode one or more portions of the content item at varying bitrates, for example, based on the one or more network conditions (e.g., bandwidth, throughput, data loss, etc.). Encoding of the one or more portions of the content item may also be based on one or more indications/notifications from the user device, such as an indication of an overflow/underflow of a buffer associated with the user device.

To prevent and/or mitigate playback quality issues associated with the content item, the encoder may, based on a rate-distortion optimization (RDO) process that considers quantization while also considering resolution and quality of experience (QoE), and/or the like, encode one or more portions of the content item at varying bitrates. For example, the encoder may encode one or more portions of the content item based on a novel cost function (e.g., video compression goal/target for efficiency, etc.) evaluation, that considers a cost (in bits) to encode the one or more portions of the content item, distortion of the one or more portions of the content item, and playback issues (e.g., real-time playback issues, potential playback issues, etc.) such as content resolution and/or quality of experience (QoE). Consideration of the playback issues such as content resolution and/or quality of experience (QoE) may be based on a novel "versatile Lagrangian multiplier" used to evaluate the cost function. The represented versatile Lagrangian multiplier may be represented as A (where the subscript v denotes the versatility of the multiplier). as described, the versatile Lagrangian multiplier may be, not just a function of a quantization parameter (QP), but also a function of an adjustment parameter based on the resolution (e.g., high resolution, low resolution, UltraHD, 4K, 8K, etc.) of a content item and/or a quality of experience (QoE) associated with the content item.

FIG. 1 shows an example system 100 for optimized content encoding (e.g., compression, video processing, etc.). The system 100 may include a content source 102 (e.g., one or more content sources 102, etc.), an encoder 104 (e.g., a video encoder, a content encoder, a Versatile Video Coding (VVC) encoder, etc.), an edge device 108 (e.g., a server, a content delivery device, a content access device, a content storage/archive device etc.), and a user device 110 (e.g., a set-top box, a mobile device, a content player, a smart device, etc.). The content source 102, the encoder 104, the edge device 108, and the user device 110 may each be connected to (e.g., interconnected to, etc.) and/or communicatively coupled to a network 106.

The network 106 may include, for example, a packet-switched network (e.g., internet protocol (IP) based network), a non-packet switched network (e.g., quadrature amplitude modulation based network), and/or the like. The network 106 may comprise network adapters, switches, routers, modems, and the like connected through wireless links (e.g., a radio frequency, satellite) and/or physical links (e.g., fiber optic cable, coaxial cable, Ethernet cable, and/or a combination thereof). The network 106 may comprise public networks, private networks, wide area networks (e.g., Internet), local area networks, and/or the like. The network 106 may comprise a content access network, content distribution network, and/or the like. The network 106 may be a content delivery network, a content access network, and/or the like. The network 106 may be configured to provide content from a variety of sources (e.g., the content source 102, etc.) using a variety of network paths, protocols, devices, and/or the like. The content delivery network and/or content access network may be managed (e.g., deployed, serviced) by a content provider, a service provider, and/or the like. The network 106 may distribute content, for example, content from the content source 102, to user device 110. Although only the user device 110 is shown, the system 100 may multiple user devices. The network 106 may be an optical fiber network, a coaxial cable network, a hybrid fiber-coaxial network, a wireless network, a satellite system, a direct broadcast system, or any combination thereof. The network 106 may communicate using technologies and/or communication protocols such as WLAN technology based on the institute of Electrical and Electronics Engineers (IEEE) 802.11 standard, wireless cellular technology, Bluetooth, coaxial cable, Ethernet, fiber optics, microwave, satellite, Public Switched Telephone Network (PTSN), Digital Subscriber Line (DSL), BPL, or any other technology and/or communication protocol.

The content source 102 may include a headend, a video-on-demand server, a cable modem termination system, and/or the like. The content source 102 may provide content (e.g., video, audio, games, applications, data) and/or a content item (e.g., high-resolution video, streaming content, a movie, a show/program, etc.) to the user. The content source 102 may provide streaming media, such as live content, on-demand content (e.g., video-on-demand), content recordings, and/or the like. The content source 102 may be managed by third-party content providers, service providers, online content providers, over-the-top content providers, and/or the like. A content item (e.g., high-resolution video, streaming content, a movie, a show/program, etc.) may be provided via a subscription, by individual item purchase or rental, and/or the like. The content source 102 may be configured to provide the content item via a packet-switched network path, such as via an internet protocol (IP) based connection. Content and/or content items may be accessed by user devices (e.g. the user device 110, etc.) via applications, such as mobile applications, television applications, set-top box applications, gaming device applications, and/or the like. An application may be a custom application (e.g., by a content provider, for a specific device), a general content browser (e.g., a web browser), an electronic program guide, and/or the like.

The content source 102 may provide uncompressed content items, such as raw video data, comprising one or more portions (e.g., frames/slices, group of pictures (GOP), coding units (CU), coding tree units (CTU), etc.). The content source 102 and the encoder 104 may be incorporated as a single device and/or may be co-located at a location. The content source 102 may provide the uncompressed content items based on a request for the uncompressed content items, such as a request from the encoder 104, the user device 111, the edge device 108, and/or any device/component of the system 100.

The edge device 108 may be configured to provide content, services, and/or the like to the user device 110. The edge device 108 may be one of a plurality of edge devices distributed across the network 106. The edge device 108 may be located in a region proximate to the user device 110. A request for a content item from the user device 110 may be directed to the edge device 108 (e.g., due to the location of the edge device and/or network conditions). The edge device 108 may be configured to package content and/or content items for delivery to the user device 110 (e.g., in a specific format requested by the user device 110, etc.), provide the user device 110 a manifest file (e.g., or other index file describing portions of the content), provide streaming content (e.g., unicast, multicast), provide a file transfer, and/or the like. The edge device 108 may cache or otherwise store content (e.g., frequently requested content) to enable faster delivery of content and/or content items to users.

The edge device 108 may receive a request for a content item, such as a request for high-resolution video and/or the like, provide one or more portions of the content item at varying bitrates, for example, based on one or more network conditions (e.g., bandwidth, throughput, data loss, etc.), one or more indications/notifications from a user device 110 and/or the like, that cause the encoder 104 to determine an optimal coding mode for encoding the one or more portions of the content item and sending the content item to the edge device 108 to be sent to the user device 110. The encoder 104 may determine the optimal coding mode based on a cost function evaluation, that not only considers quantization, but also accounts for resolution, quality of experience (QoE), distortion, and/or the like. The encoder 104 may, for example, the optimal coding mode, encode (e.g., compress) the content item. The encoder 104 may send the encoded content item to a requesting component of the system 100, such as the edge device 108 and/or the user device 110. The edge device 108 may send (e.g., transmit, etc.) the requested encoded content item to the user device 110.

For example, encoding a content item may include the encoder 104 partitioning a portion and/or frame of the content item into a plurality of coding tree units (CTUs) that each includes a plurality of pixels. The CTUs may be partitioned into coding units (CUs) (e.g., coding blocks). The terms coding unit and coding block may be used interchangeably. As used herein, the terms picture, frame, and portions may be used interchangeably. For example, a content item may include a plurality of frames (a series of frames/pictures/portions, etc.). The plurality of frames may comprise I-frames, P-frames, and B-frames. an I-frame (Intra-coded picture) may include/represent a complete image. A P-frame (Predicted picture, delta frame) includes only the changes in an image from a previous frame. For example, in a scene where a person/actor runs across a stationary background, only the person/actor's movements need to be encoded. To save space and computational resources, the encoder 104 does not need to store the unchanging background pixels in the P-frame. A B-frame (Bidirectional predicted picture) enables the encoder 104 to save more space and computational resources by using differences between the current frame and both the preceding and following frames to specify its content.

Each frame may be divided into a quantity of partitions. Each partition may comprise a plurality of pixels. Depending on the coding format, the partition may be a block, macroblock, coding tree unit, etc. A partition may comprise an 128×128 block of image values. A partition may comprise any other size block of image values. An image value of a partition may represent a pixel. A partition may be based on luma (Y) or one of the two chroma components (Cr (U), Cb (V)). The image values of a partition may indicate a luminance component or one of the two chrominance components of the respective pixel of the partition.

The order in which the I-frames, P-frames, and B-frames are arranged is called the Group of pictures. The encoder 104 may use either an open GOP or a closed GOP. An open GOP allows B-frames from a GOP to refer to an I-frame or P-frame in an adjacent GOP. Open GOPs are very efficient but cannot be used for features such as multiplexed multi-angle DVD video. A closed GOP format uses only self-contained GOPs that do not rely on frames outside the GOP. FIGS. 2A-2E show examples of GOP hierarchical structures.

Figure 2A:
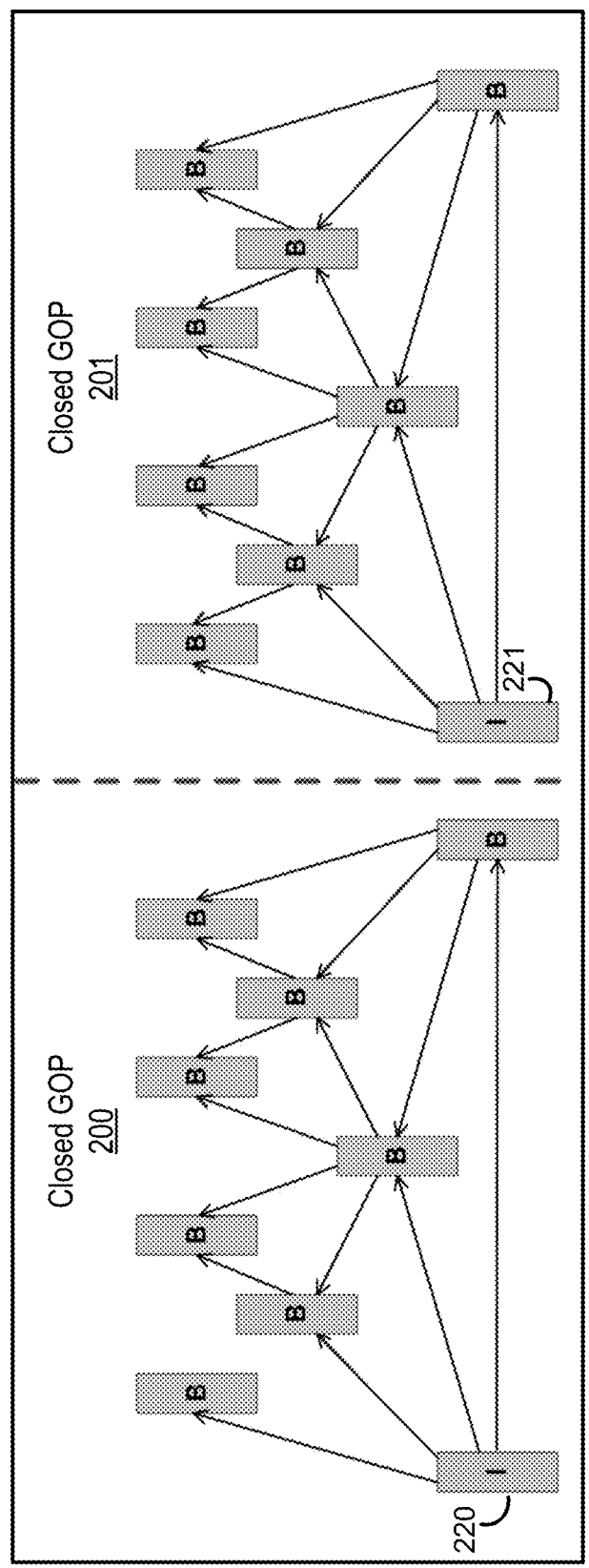
FIG. 2A-2E show examples of hierarchal structures for a group of pictures (GOP) for which encoding may be optimized.
Figure 2B:
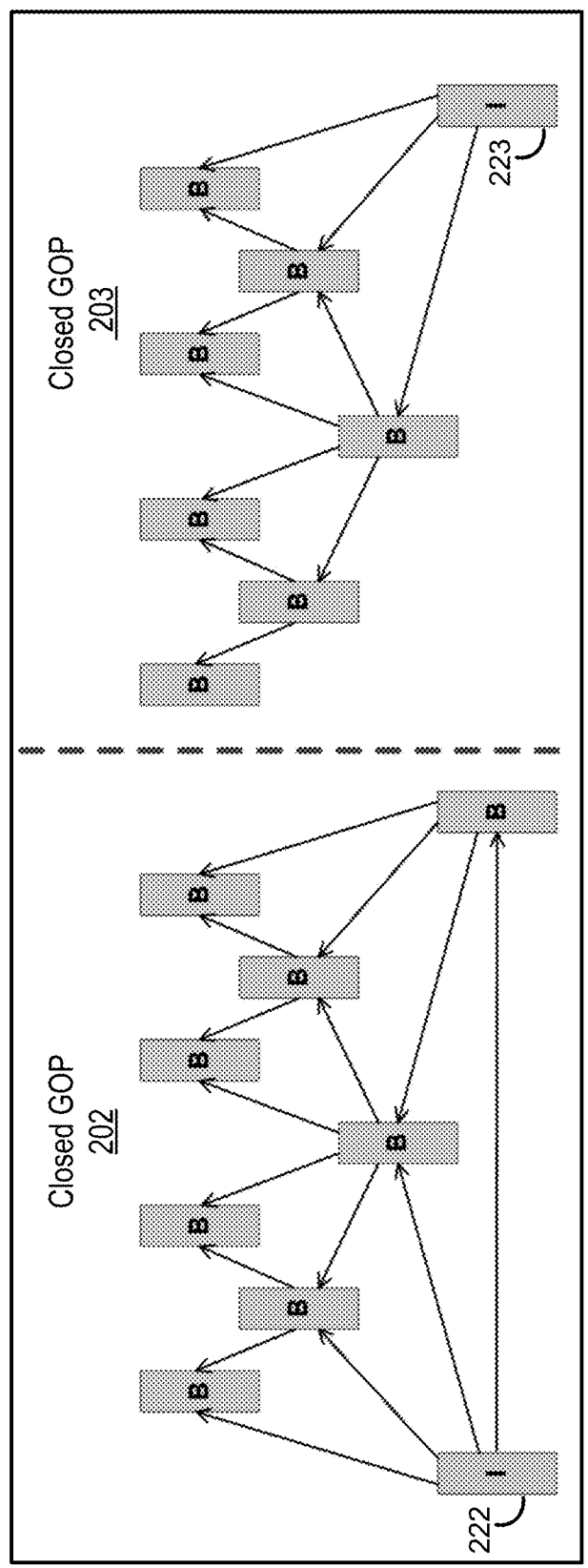

FIG. 2A shows a hierarchical structure of an example Closed Group of Pictures (GOP). The encoder may use a closed GOP structure when encoding content items according to HEVC, H.364/MPEG-AVC, or any other predecessor coding standard. As shown in FIG. 2A, GOP 200, and GOP 201 (schematically separated by a dashed line) are decoded independently by the encoder 104. For example, I-frames 220 and 221 of the GOP 200 and the GOP 201, respectively, are coded as Instantaneous Decoding Refresh (IDR) pictures, and B-frames are coded as Trailing (TRAIL) pictures. FIG. 2B shows a hierarchical structure of another example Closed GOP the encoder may use based on the HEVC coding standard. A Closed GOP hierarchical structure as shown in FIG. 2B does not require the Closed GOP 203 to start with an I-frame, thereby leading to a higher compression gain. As shown in FIG. 2B, an I-frame 223 in a Closed GOP 203 is the last frame in the display order of a GOP 202 and the GOP 203, thereby resulting in a more efficient coding structure and higher compression gain. Similarly to FIG. 2A, the I-frame 222 and the I-frame 223 are each encoded as IDR pictures, and B-pictures are coded as Trailing (TRAIL) pictures in GOP 202. However, B-pictures in GOP 203 are coded as Random Access Decodable Leading (RADL) pictures which precede the I-frame 223 in GOP 203 in the display order.

Figure 2C:
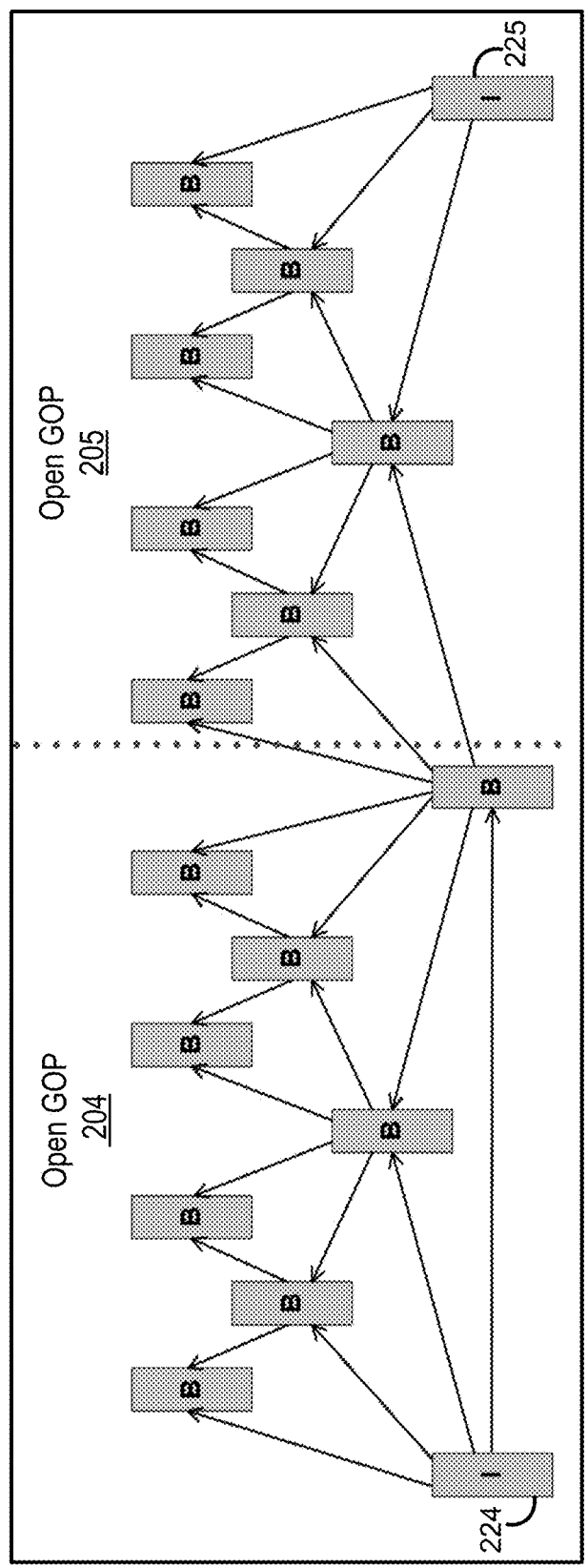

As shown in FIG. 2C, the encoder 104, based on the HEVC coding standard, may use an Open GOP hierarchical structure where neighboring GOPs share one or more reference frames (pictures). A GOP 204 and a GOP 205 may share one or more reference frames (pictures). For example, The hierarchical structure of FIG. 2C is more efficient (in terms of a coding gain) than the hierarchical structure that is shown in FIG. 2B, because B-frames are encoded more efficiently due to sharing motion information among them, and thereby reducing the overall size of the B-frames. According to the hierarchical structure of FIG. 2C, an I-frame 224 of Open GOP 204 coded as an IDR picture, an I-picture 225 of Open GOP 205 is encoded as a Clean Random Access (CRA) picture, the B-frames in Open GOP 204 are coded as TRIAL pictures, and B-frames in Open GOP 205 are coded as Random Access Skipped Leading (RASL) pictures.

Each frame of a content item may be split into a regular grid of blocks or coding tree units (CTU), and each block of a grid of blocks (CTU) may be a coding unit (CU). The size of a CTU may be 128×128 pixels, for example. However, a greater size CTU is contemplated. VVC includes a quadtree (e.g., CTU) with nested multi-type tree (MTT) partitioning with binary splits (e.g., vertical binary spits, horizontal binary splits, etc.) and ternary splits (e.g., vertical ternary spits, horizontal ternary splits, etc.). Splitting may be performed by the encoder 104 to adapt to various characteristics (e.g., image features, textures) of a content item.

The encoder 104 may vary the bitrate of a content item, for example, by downsampling and/or upsampling one or more portions of the content item. For example, when downsampling, the encoder 104 may lower a sampling rate and/or sample size (bits per sample) of a content item. The encoder 104 may downsample a content item to decrease the bitrate when sending the content item to the user device 110, for example, due to limited bandwidth or to convert to a limited content item format. An increase in available bandwidth may cause the encoder 104 to upsample one or more portions of a content item. When upsampling, the encoder 104 may insert zero-valued samples between original samples of one or more portions of a content item to increase a sampling rate. The encoder 104, for example, using the VVC coding standard, may achieve additional bitrate savings by enabling reference frames (pictures) (e.g., B-frames) that have been either downsampled or upsampled.

Figure 2D:
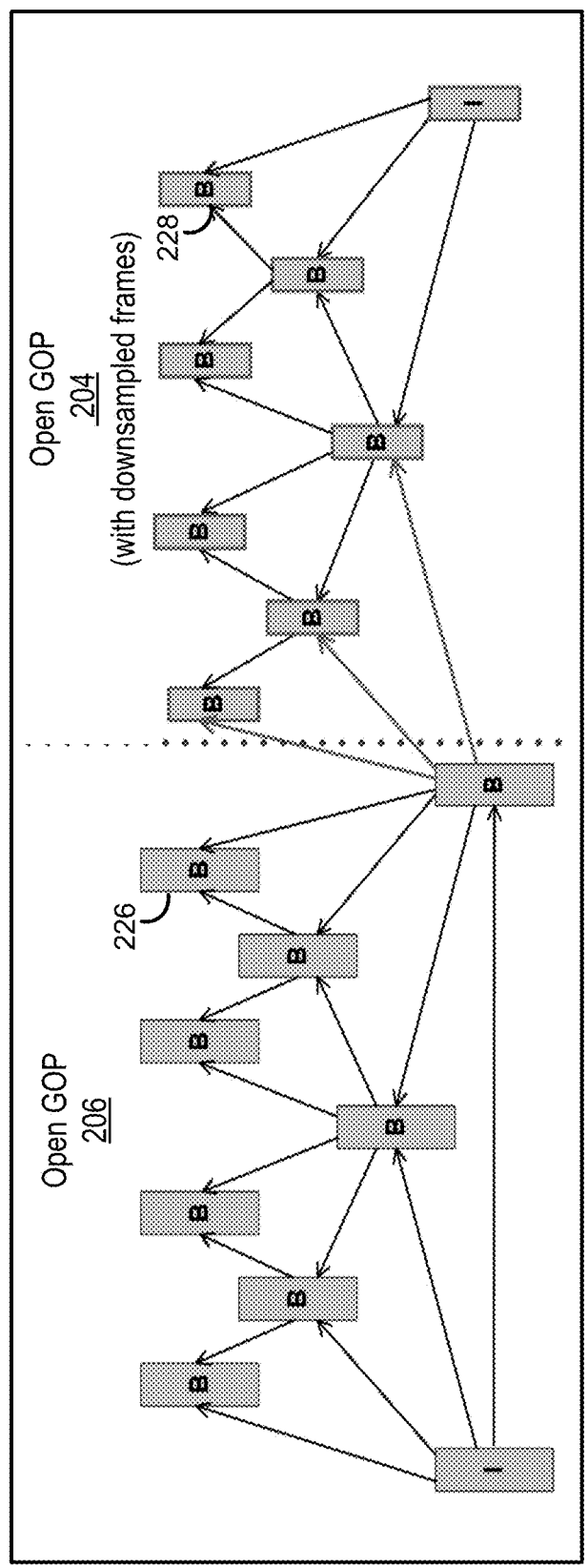

FIG. 2D shows an example of downsampling an Open GOP hierarchical structure. Neighboring Open GOP 206 and Open GOP 208 share one or more reference frames that are downsampled to a lower special resolution. The downsampling is represented by the decrease in size in the reference frames (B-frames) in Open GOP 208. For example, B-frame 228 of Open GOP 208 is smaller than B-frame 226 of Open GOP 206.

Figure 2E:
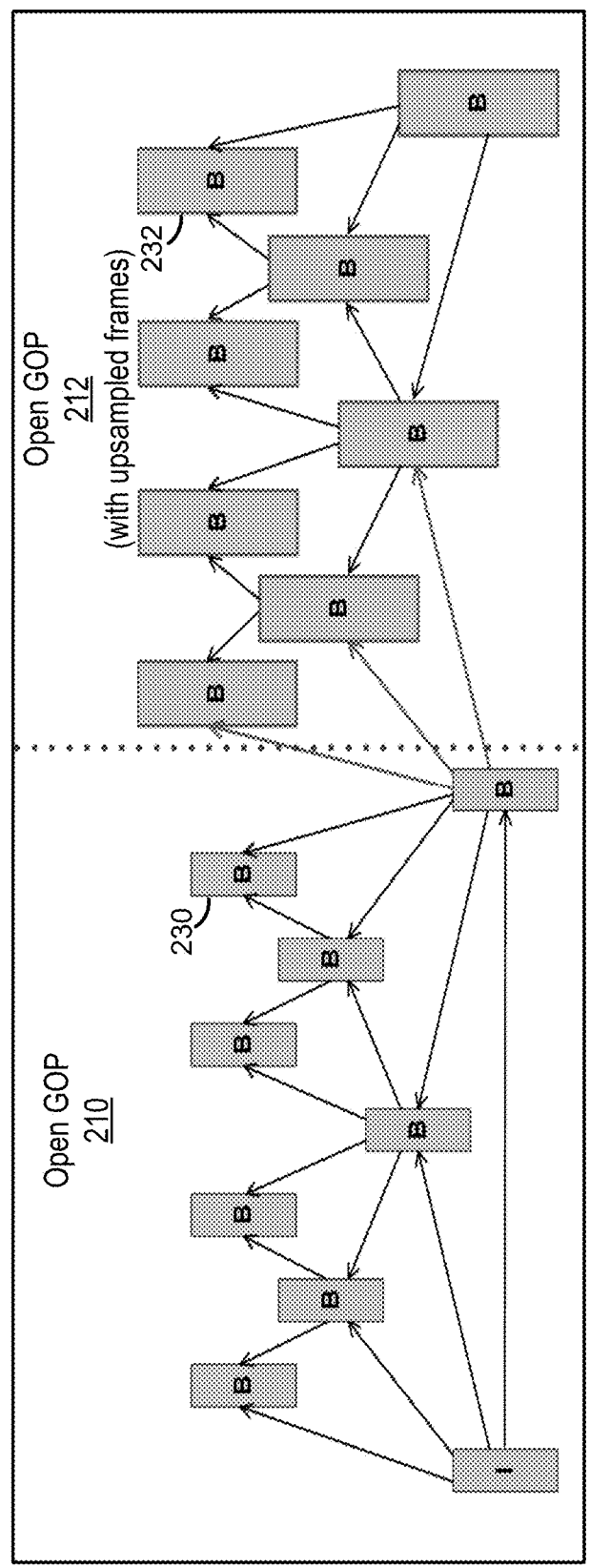

FIG. 2E shows an example of downsampling an Open GOP hierarchical structure. Neighboring Open GOP 210 and Open GOP 212 share one or more reference frames that are upsampled to a higher special resolution. The downsampling is represented by the increase in size in the reference frames (B-frames) in Open GOP 210. For example, B-frame 232 of Open GOP 212 is larger than B-frame 230 of Open GOP 212. As described, the encoder 104 may downsample and/or upsample one or more portions of a content item to achieve the desired transmission bitrate due to conditions of the network 106, for example, dynamic changes in the available network bandwidth.

The encoder 104 may generate a prediction of each current CU based on previously encoded data. The prediction may comprise intra-prediction, which is based on previously encoded data of the current frame being encoded. The prediction may comprise inter-prediction, which is based on previously encoded data of a previously encoded reference frame. The inter-prediction stage may comprise determining a prediction unit (PU) (e.g., a prediction area) using motion compensation by determining a PU that best matches a prediction region in the CU. The encoder 104 may generate a residual signal by determining a difference between the determined PU from the prediction region in the CU. The residual signals may be transformed using, for example, a discrete cosine transform (DCT), which may generate coefficients associated with the residuals.

Generating a residual signal by determining a difference between the determined PU from the prediction region in the CU is a decision, among many, the encoder 104 must make when encoding one or more portions of a content item. Each encoding decision made by the encoder 104 may distort one or more portions of the content item. The encoder 104 may mitigate distortion caused by encoding decisions to by optimally encoding the one or more portions of the content as a function of the estimated distortion. For example, the encoder may use rate-distortion optimization to select the best coding modes that lead to the smallest distortion for a given/target bit-rate.

For example, during the encoding process, the encoder 104 may traverse each CTU structure and determine all possible intra/inter-picture prediction modes of each CU (or any other portion of the content item), such that a combination of the resultative CU structure along with the corresponding intra/inter-picture prediction modes will lead to a minimal rate-distortion (RD) cost. Generally, for performing optimal coding mode selection, Equation 1 represents cost function J that should be minimized:

$$\min\{J(D,R)\}=D+\lambda*R \quad \text{(Equation 1)}$$

where D is distortion, R is the cost (in bits) to encode the decision, and $\lambda$ denotes a Lagrangian multiplier being a function of a quantization parameter (QP). The Lagrangian multiplier may be used to adjust the tradeoff between the bitrate R and distortion D. Typically, when $\lambda$ has a relatively small value, the RDO process selects the best coding modes that lead to relatively small distortion, and vice-versa. The cost function J may be evaluated for all possible coding modes (including intra-picture prediction modes, inter-picture prediction modes, etc.) to determine the best mode in terms of rate-distortion. The cost function J represents the main content compression goal regarding the coding efficiency while condensing the visual data and minimizing the loss in terms of the objective visual quality due to the compression. The distortion D, relates to the reduction in video quality due to encoding. There is always a trade-off between the distortion D and the bitrate R—the smaller the rate, the larger the distortion, and vise-versa. Because the parameter $\lambda$ is a function of a quantization parameter (QP), it also affects the distortion D: the larger the QP value—the larger the distortion D. Increasing the QP value results in a lower transmission bitrate R. A QP may be separately set for each CU (within every CTU). As such, the QP may vary (e.g., be increased or decreased) from one CU to another. The QP values in HEVC range from 1 to 51, while the maximum QP in VVC is further extended from 51 to 63. By varying the QP values on the CTU or CU level within each frame, it is possible to increase or decrease the desired transmission bitrate accordingly.

The encoder 104 may perform a quantization process to quantize the coefficients associated with the residuals. The encoder 104 may use a QP parameter/value determined from the RDO process to quantize the coefficients associated with the residuals. The transformation and quantization processes may be performed on transform units (TUs) based on partitions of the CUs.

A compressed bitstream of the one or more portions of the content item may then be transmitted by the encoder 104, for example, to the user device 110. The transmitted compressed bitstream may comprise the quantized coefficients and information to enable the user device 110 (e.g., a decoder of the user device 110, etc.) to regenerate the prediction blocks, such as motion vector associated with the motion compensation. The decoder may receive the compressed bitstream and may decode the compressed bitstream to regenerate the video content.

As explained, traditionally, an RDO process is performed with a trade-off between the distortion and the bitrate, without consideration to how spatial resolution affects an encoded (compressed) content item. The encoder 104, when encoding one or more portions (e.g., frames/slices, group of pictures (GOP), coding units (CU), coding tree units (CTU), etc.) of a content item according to RDO to generate a compressed bitstream, may also make determinations and/or encoding decisions based on how spatial resolution affects the encoded (compressed) content item. For example, the encoder 104 may consider changes in resolution (e.g., increases in resolution, decreases in resolution, etc.) will update the cost function J, flexibly and adaptively, to determine the best set of coding modes.

As explained later in further detail, to substantially reduce the transmission bitrate R for a content item, such as streaming HEVC/VVC-encoded UltraHD-resolution videos, without and/or minimal impact on output, display, and/or playback (e.g., video presentation quality, etc.), such as a visually noticeable increase of distortion D, the encoder 104 may use a novel "versatile Lagrangian multiplier" represented as $\lambda_v$ (where the subscript v denotes the versatility of the multiplier). As shown by Equation 2, the Lagrangian multiplier $\lambda$ is a function of not only a quantization parameter (QP) but also an adjustment parameter (e.g., a quantizing adjusting parameter, etc.), such as resolution (S):

$$\lambda_v(QP|S)=\lambda(QP)*f_s(S) \quad \text{(Equation 2)}$$

where $f_s$ is a quality factor that has a positive value and depends on the spatial resolution of one or more reference frames (e.g., B-frames). According to the methods used by the encoder 104, the higher the resolution is—the larger its value, and in turn, the larger the value of $\lambda_v$.

Figure 3:
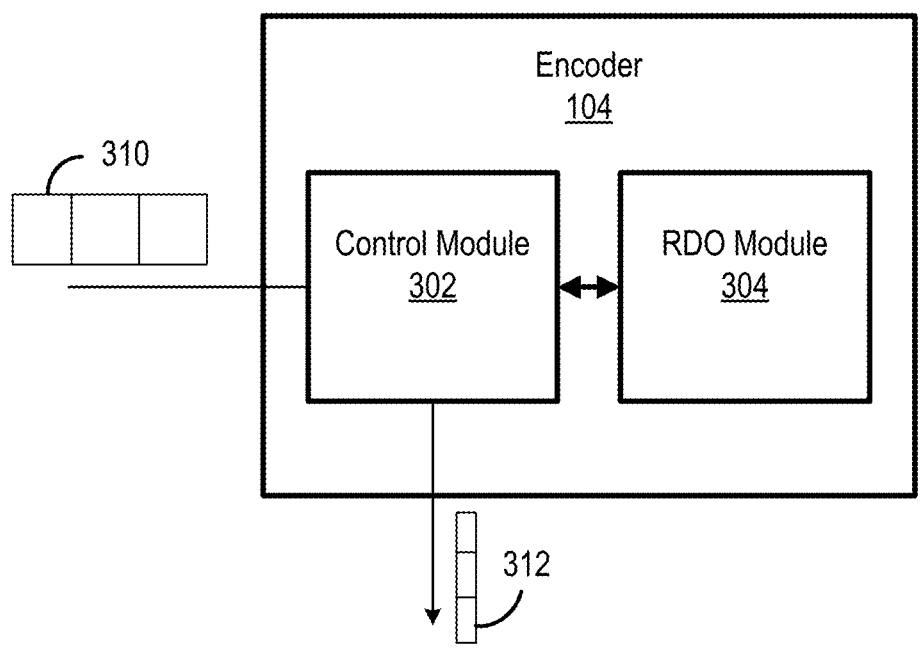
FIG. 3 shows a block diagram of an example encoder for optimized content encoding.

FIG. 3 shows an example block diagram of the encoder 104. Although components of the encoder 104 are shown separately (as separate modules), the components of the encoder 104 may be a single component (a single module) and/or may include one or more functional modules and/or units, such as one or more discrete and/or integrated modules/units.

The encoder 104 may receive one a current portion of one or more portions (e.g., frames/slices, group of pictures (GOP), coding units (CU), coding tree units (CTU), etc.) of a content item (e.g., high-resolution video, streaming content, a movie, a show/program, etc.) to be encoded. For example, a content item may include high-resolution video (e.g., 4k video, 8k video, UltraHD video, etc.) and one or more portions of the content item may include one or more coding blocks (e.g., coding blocks, etc.). The encoder 104 may encode content and/or content items according to any coding (video coding) standard. For example, the encoder 104 may encode content items according to an H.261 coding standard, any H.26X coding standard (e.g., H.265/MPEG-HEVC (High-Efficiency Video Coding)), Advanced Video Coding (AVC/H.364), Versatile Video Coding (VVC), and/or any other historical or future coding standard.

The encoder 104 may use VVC coding as a significant coding gain over any other predecessor coding standard. When encoding based on the VVC coding standard, the encoder 104 may use a recursive quadtree partitioning with nested multi-type tree coding block structures of binary and ternary splits. Each partitioned region may be logically separated in a bitstream of a content item. Independent partitioning enables the encoder 104 (and/or the user device 110) to use/implement parallel processing. A content item bitstream may allow the extraction of a cropped part of the content item in real-time (e.g., on the fly, etc.) without re-encoding. The encoder 104 may use similar methods when encoding content items according to any block-based hybrid video coding standards, such as H.264/MPEG-AVC, H.265/MPEG-HEVC, H.266/MPEG-VVC, MPEG-5 EVC, MPEG-5 LCEVC, AV1. The encoder 104 may use similar methods when encoding High Dynamic Range (HDR) content and/or Standard Dynamic Range (SDR) content.

Figure 4:
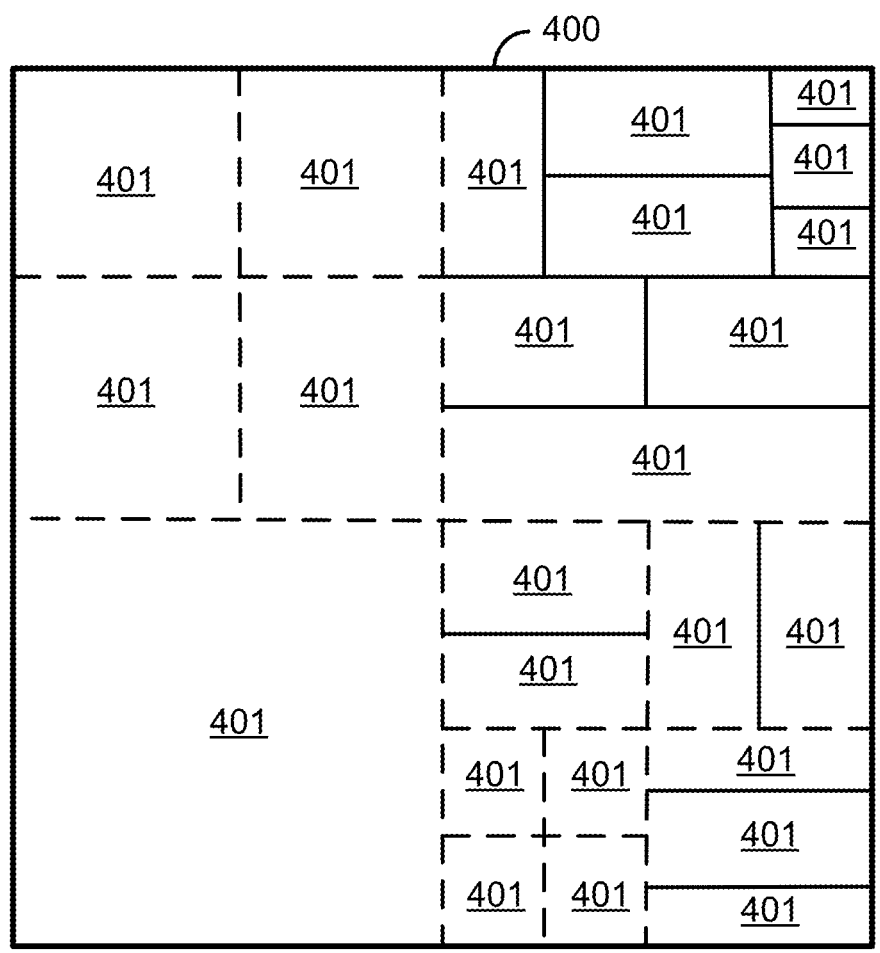
FIG. 4 shows an example quadtree data structure used for optimized content encoding.

FIG. 4 shows an example VVC quadtree 400 with nested multi-type tree coding block structures of binary and ternary splits that may be used by the encoder 104. As shown, the dotted lines/edges represent quadtree partitioning and the rest of the lines/edges represent the multi-type tree partitioning that forms a content-adaptive coding tree structure. Each coding unit 401 can vary from the maximal size of the quadtree 400 (e.g., 128×128 pixels, etc.) to a minimal size (e.g., 4×4 pixels, etc.) in terms of luma samples.

The encoder 104 may use additional tools such as Intra-mode coding with 67 Intra-picture prediction modes, Intra Block Copy (IBC), Bi-Directional Optical Flow (BDOF), Adaptive Motion Vector Resolution (AMVR), Geometric Partitioning Mode (GPM), Combined Inter and Intra Prediction (CIIP), Adaptive Loop Filter (ALF), and/or the like.

Returning to FIG. 3, the encoder 104 may include a control module 302. The control module 302 may include one or more units (e.g., a motion estimation/compensation (inter-prediction) unit, an intra-prediction unit, transform/quantization unit, an entropy coding unit, an inverse quantization/transform unit, a reference picture/frame unit, etc.), and/or logical blocks of instructions for encoding a content item (e.g., high-resolution video, streaming content, a movie, a show/program, etc.). The encoder 104 may receive one or more portions of a content item (e.g., high-resolution video, streaming content, a movie, a show/program, etc.). The encoder may receive one or more portions of raw and/or preprocessed video data (e.g., from the content source 102, etc.), such as video blocks 310, and the control module 302 may use the one or more units and/or execute the one or more logical blocks of instructions to convert the raw video data and/or preprocessed video data into encoded (e.g., compressed, etc.) video data 312.

The encoder 104 may include a rate-distortion optimization 304. The RDO module 304 may make logical decisions for the control module 302. For example, the RDO module 304 may make logical decisions for one or more units of the control module 302 and/or based on one or more executed instructions by the control module 302. For example, based on one or more previously encoded portion (e.g., frame/slice, group of pictures (GOP), a coding unit (CU), coding tree unit (CTU), etc.) of a content item, such as a portion of a content item previously sent to the user device 110 (e.g., live streaming, etc.), the RDO module 304 may determine how a current portion of the content item is partitioned into a plurality of CUs (e.g., quadtree partitioning, CTUs partitioned into CUs, etc.), and how a CU is partitioned into one or more predictive units (PUs) and/or transform units (TUs). For example, homogeneous regions of a current portion (e.g., no or slight difference among the pixel values in the regions) may be partitioned into relatively larger blocks, and detailed regions of the current frame (e.g., a significant difference among the pixel values in the regions) may be partitioned into relatively smaller blocks.

The RDO module 304 may control how the current portion of the content item is predicted. The current portion may be predicted via inter and/or intra prediction. For example, inter-prediction may exploit temporal redundancies in a sequence of frames of a content item (e.g. similarities between corresponding blocks of successive frames, etc.) to reduce compression data. The RDO module 304 may determine a motion vector of a block in the current frame based on a corresponding block in one or more reference frames. On the other hand, intra-prediction may exploit spatial redundancies within a single frame (e.g., similarities between adjacent blocks of frames of the content item, etc.) to reduce compression data. With intra-prediction, reference pixels adjacent to a current block may be used to generate a prediction block. Intra-prediction may be implemented using any of a plurality of available prediction modes or directions determined by the RDO module 304. For example, the RDO module 304 may calculate a sum of absolute error (SAE) for each prediction mode, and select a prediction mode that results in the smallest SAE.

The RDO module 304 may be used to make logical decisions for quantizing one or more portions of a content item and/or performing any other lossy compression technique on any portion of a content item, such as determining a quantization parameter to be used in a rate-distortion process before quantization. For example, the RDO module 304 may determine/select a quantization parameter (Q)P for RDO of any portion of a content item. When determining a quantization parameter (QP) for an RDO process on one or more portions of a content item, the RDO module 304 may cause the content resolution, and/or quality of experience (QoE), to also be considered.

For example, the playback quality of the content item may be affected by one or more conditions associated with a user device (e.g., the user device 110, etc.), such as an overflow/underflow buffer condition that causes jittery images/video, paused images/video, blurred images/video, artifacts, and/or the like. While a user device 110 is receiving (e.g., streaming, etc.) a portion of a content item, the encoder 104 may encode/compress one or more portions of the content item to adjust to a varying network condition (e.g., bandwidth, throughput, packet loss, etc.). The encoder may encode one or more coding blocks at varying bitrates, for example, based on the one or more network conditions (e.g., bandwidth, throughput, data loss, etc.) that may affect resolution, quality of experience (QoE). The RDO module 304 may carefully consider a plurality of parameters such as spatial and temporal resolution, compression rate, and/or the like when encoding content.

Content items are typically compressed at different bitrates (each related to the different visual resolution/quality), thereby resulting in a group of so-called "representations", which are typically decoded independently. So, in case there is a drop in the available network bandwidth, the representation with a lower resolution (e.g., obtained by downsampling) may be selected to be transmitted to the end-user. Alternatively, based on an increase in the available network bandwidth, the representation with a higher resolution (e.g., obtained by upsampling) may be selected to be transmitted to the end-user. While the encoder 104 may be configured to operate in such a manner (e.g., generate representations of a content item that may be retrieved based on network conditions, etc.), the encoder may address such network conditions by adaptively adjusting the bitstream of a current content item without a need to facilitate retrieval of different representations of the content item.

As previously described, the purpose of RDO is to select the best coding modes that lead to the smallest distortion. Traditionally, when encoding content items according to HEVC and VVC, the Lagrangian multiplier is a function of a quantization parameter (QP) only, thereby depending on a target compression rate (bitrate) without considering either visual quality or desired/estimated QoE (which vary during transmission/streaming of a content item as a function of the available network conditions). This issue is even more critical for the VVC coding standard due to its relatively large CTU sizes of 128×128 pixels (instead of 64×64 of HEVC), each of which may be split into a plurality of varying-size CUs to determine the best set of coding modes.

As explained, traditionally, RDO is performed with a trade-off between the distortion and the bitrate, without consideration of how spatial resolution affects an encoded (compressed) content item. The RDO module 304, as described herein, when performing an RDO process on any portion of a content item may consider how resolution affects the encoded (compressed) content item. For example, the encoder 104 may consider changes in resolution (e.g., increases in resolution, decreases in resolution, etc.) will update the cost function J of Equation 1, flexibly and adaptively, to determine the best set of coding modes used by the control module 302.

To substantially reduce the transmission bitrate (denoted R in Equation 1) for a content item, such as streaming HEVC/VVC-encoded UltraHD-resolution videos, without and/or minimal impact on output, display, and/or playback (e.g., video presentation quality, etc.), such as a visually noticeable increase of distortion (denoted D in Equation 1), the RDO module 304 may use a novel "versatile Lagrangian multiplier" represented as $\lambda_v$ (where the subscript v denotes the versatility of the multiplier). As shown by Equation 2, the Lagrangian multiplier is a function of not only a quantization parameter (QP) but also resolution (S):

As a result, more bits can be allocated to corresponding portions (e.g., frames/slices, group of pictures (GOP), coding units (CU), coding tree units (CTU), etc.) of a content item to provide better visual quality, which in turn leads to an increase in the bitrate (denoted R in Equation 1). On the other hand, the lower the resolution of the reference frames is—the smaller the value of $\lambda_v$, which leads to a decrease in the bitrate (denoted R in Equation 1). Since the increase and decrease in the bitrate can be achieved also by decreasing and increasing QP values, respectively, there is a tradeoff between the QP values and the resolution S of the reference frames. The RDO module 304 may consider the tradeoff between the QP values and the resolution S when executing an RDO process to select the best coding modes for all possible encoding scenarios. Further, to reduce the computational complexity of the overall RDO process, the RDO module 304 considers the tradeoff between the QP values and the resolution S for a predefined and/or limited set of all possible coding modes.

The RDO module 304 may execute an RDO process in different coding levels and for any portion (e.g., frame/slice, group of pictures (GOP), a coding unit (CU), coding tree unit (CTU), etc.) of a content item, to make determinations on the resolution as a tradeoff of the compression rate. For example, when the control module 302 is preparing to encode a portion of a content item, the RDO module 304 may make determinations on the resolution as a tradeoff of the compression rate by optimally minimizing a cost $J_v$ (derived from Equation 1), based on Equation 3 as follows:

$$\min\{J_v(D|R)\} = \Sigma_{m=1}^{N} D_{m,n} + \lambda_v(QP|S) * \Sigma_{m=1}^{N} R_m,$$
$$n = \Sigma_{m=1}^{N} (D_{m,n} + \lambda(QP) * f_s(S) * R_{m,n}) \quad \text{(Equation 3)}$$

wherein distortion $D_{m,n}$ represents the distortion of the m-th CTU in the n-th coding parameters set, and similarly, rate $R_{m,n}$ represents the rate of the m-th CTU in the n-th coding parameters set. The overall number of CTUs in a given slice/frame is denoted by N.

When the control module 302 is preparing to encode a portion of a content item, such as a frame/picture of the content item, the RDO module 304 may determine/select a spatial resolution that leads to the minimal cost $J_v$ in lookahead, thereby allowing to select corresponding frame/picture types (e.g., B-frames) and initial QP values before encoding the frame/picture. Notably and novelly, the RDO module 304 may perform an RDO process while making a special emphasis on the control module 302 selecting an optimal spatial resolution for encoding (reference) frames in a given GOP by adaptively and flexibly determining the best encoding settings for the desired bitrate.

Notably and novelly, when the control module 302 is preparing to encode a portion of a content item, the RDO module 304 may use the Lagrangian multiplier as a function of not just a QP but also a desired/estimated Quality of Experience (QoE) based on Equation 4:

$$\lambda_v(QP|QoE) = \lambda * (1-f_v) \quad \text{(Equation 4)}$$

where $f_v$ is a quality factor, which may vary between 0 and 1, and can have either a positive or negative value according to a change in the desired/estimated QoE. The encoder 104 (via the RDO module 304, etc.) may determine the QoE before encoding a content item or in real-time (i.e. during the live streaming) based on different levels of Quality of Service (QoS). For example, different levels of QoS may include an application QoS (e.g., spatial resolution, a given frame rate, objective quality metrics, response time. etc.), a system QoS (e.g., a burst and gap density, etc.), and a network QoS (e.g., a network delay, available bandwidth, packet loss ratio, etc.). The encoder 104 (via the RDO module 304, etc.) may determine an initial value for $f_v$ (and in turn of $\lambda_v$) in an empirical/statistical manner.

Notably and novelly, when the control module 302 is preparing to encode a portion of a content item, the RDO module 304 may perform an RDO process on different coding levels, such as at a GOP level, a slice/frame level, and/or the like, and is, therefore, able to make decisions on the resolution as a tradeoff of the compression rate by optimally minimizing the cost $J_v$ based on Equation 5 as follows:

$$\min\{J_v(D|R)\} = \Sigma_{m=1}^N D_{m,n} + \lambda_v(QP|QoE)^* \Sigma_{m=1}^N R_m,$$
$$n = \Sigma_{m=1}^N (D_{m,n} + \lambda^*(1-f_v)^* R_{m,n}) = \Sigma_{m=1}^N (D_{m,n} + \lambda^* R_{m,n}) - \Sigma_{m=1}^N \lambda^* f_v^* R_{m,n} = \Sigma_{m=1}^N J_{m,n} - \Sigma_{m=1}^N \lambda^* f_v^* R_{m,n}$$
(Equation 5)

wherein distortion $D_{m,n}$ represents the distortion of the m-th CTU in the n-th coding parameters set, and similarly, rate $R_{m,n}$ represents the rate of the m-th CTU in the n-th coding parameters set, and $J_{m,n}$ represents a corresponding cost function. The overall number of CTUs in a given slice/frame is denoted by N.

The RDO module 304, employing RDO in the described versatile manner, enables the encoder 104 to optimally encode one or more portions (e.g., frames/slices, group of pictures (GOP), coding units (CU), coding tree units (CTU), etc.) of a content item, such as an entire GOP. The RDO module 304 enables a significant coding gain due to much more accurate inter-picture prediction.

Figure 5:
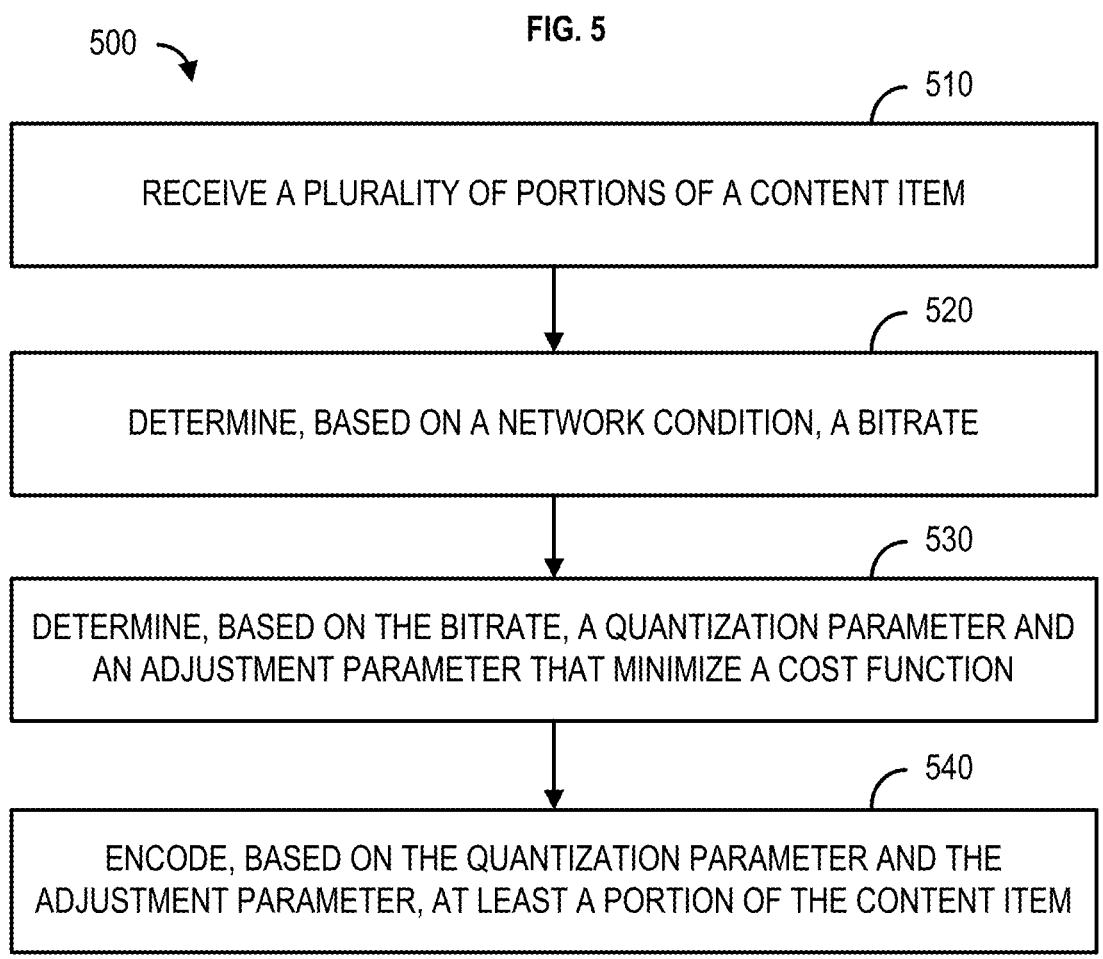
FIG. 5 shows a flowchart of an example method for optimized content encoding.

FIG. 5 is a flowchart of an example method 500 for optimized content encoding (e.g., compression, video processing, etc.). An encoder (e.g., a video encoder, a content encoder, a Versatile Video Coding (VVC) encoder, the encoder 104, etc.) may flexibly and adaptively adjust encoding parameters (e.g., a quantization parameter, an adjustment parameter, etc.) when encoding a content item (e.g., high-resolution video, streaming content, a movie, a show/program, etc.) to allocate (e.g., upsample/upscale, downsample/downscale, etc.) a bitrate to one or more portions (e.g., frames/slices, group of pictures (GOP), coding units (CU), coding tree units (CTU), etc.) of the content item. The encoder may encode one or more portions of the content item at varying bitrates, for example, based on one or more network conditions (e.g., bandwidth, throughput, data loss, etc.), one or more indications/notifications from a user device (e.g., a set-top box, a mobile device, a content player, a smart device, etc.), and/or the like. The encoder, based on a rate-distortion optimization (RDO process) that not only considers quantization, but also accounts for resolution and quality of experience (QoE), and/or the like, may encode one or more portions of the content item at varying bitrates. For example, the encoder may minimize, based on a versatile Lagrangian multiplier that not only considers quantization (a QP parameter), also considers resolution and quality of experience (QoE), minimizes a cost function (e.g., a rate-distortion optimization function, etc.) uses when encoding portions of the content item at varying bitrates without reducing the visual presentation quality of the content item and maintaining an end-user quality of experience (QoE) at an optimal level.

At step 510, a plurality of portions (e.g., frames/slices, group of pictures (GOP), coding units (CU), coding tree units (CTU), etc.) of a content item (e.g., high-resolution video, streaming content, a movie, a show/program, etc.) may be received. The encoder may receive the plurality of portions of the content item. The content item may be a raw, uncompressed content item. The encoder may receive the plurality of portions of the content item from a content source and/or a content item preprocessor. The encoder may receive the plurality of portions of the content item based on a request for the content item from a user device (e.g., a set-top box, a mobile device, a content player, a smart device, etc.). The encoder may send one or more portions of the content item to the user device.

At step 520, a bitrate may be determined. The encoder may determine the bitrate. The bitrate may be for one or more portions of the plurality of portions of the content item. The encoder may determine the bitrate based on a network condition. The network condition may be, for example, an indication of available bandwidth associated with a network, data throughput associated with the network, data loss associated with the network, and/or the like. The indication of the network condition may be received from the user device. For example, an overrun condition and/or underrun condition of a buffer associated with the user device may cause the user device to send the indication of the network condition to the encoder. For example, while a user device is streaming UltraHD/4K resolution video content, an overrun/underrun condition of a buffer may cause the user device to send the indication of the network condition to the encoder. Any network device and/or network component, such as a content server, a content delivery network (CDN) device, a content access device, and/or the like, may send indications of network conditions to the encoder. The encoder may periodically send a signal to any network device and/or network component to determine a condition of the network.

The bitrate may be based on a compression goal. The compression goal may be to decrease a transmission bitrate, particularly when the content item is streamed UltraHD/4K (and/or 8K) resolution video content, substantially without reducing the visual presentation quality of the content item and keeping an end-user (e.g., the user device, etc.) quality of experience (QoE) at an optimal level. For example, the bitrate may be based on the type of content and/or content item.

At step 530, a quantization parameter and an adjustment parameter may be determined. The encoder may determine the quantization parameter and an adjustment parameter. The quantization parameter may be any one of 63 quantization parameters. The adjustment parameter may be based on and/or indicate at least one of the resolution, and/or playback quality of experience (QoE) associated with the content item. The encoder may determine the quantization parameter and the adjustment parameter based on the bitrate. For example, the encoder may determine a value for the quantization parameter and a value for the adjustment parameter that causes a Langaragian multiplier to minimize a cost function comprising the bitrate during a rate-distortion optimization process.

For example, the encoder may use a novel "versatile Lagrangian multiplier" represented as $\lambda_v$ (where the subscript v denotes the versatility of the multiplier). The Lagrangian multiplier $\lambda$ may be more than simply a function of a quantization parameter (QP), and also include and/or account for an adjustment parameter associated with resolution (S):

$$\lambda_v(QP|S) = \lambda(QP)^* f_s(S)$$

where $f_s$ is a quality factor that has a positive value and depends on the spatial resolution of one or more reference frames (e.g., B-frames) of one or more portions of the content item. The higher the resolution is—the larger its value, and in turn, the larger the value of $\lambda_v$.

The Lagrangian multiplier $\lambda_v$ may be more than simply a function of a quantization parameter (QP), and also include and/or account for an adjustment parameter associated with quality of experience (QoE):

$$\lambda_v(QP|QoE) = \lambda^*(1-f_v)$$

where $f_v$ is a quality factor, which may vary between 0 and 1, and can have either a positive or negative value according to a change in the desired/estimated QoE. The encoder may determine the QoE before encoding portions of the content item or in real-time (i.e. during the live streaming) based on different levels of Quality of Service (QoS). For example, different levels of QoS may include an application QoS (e.g., spatial resolution, a given frame rate, objective quality metrics, response time. etc.), a system QoS (e.g., a burst and gap density, etc.), and a network QoS (e.g., a network delay, available bandwidth, packet loss ratio, etc.). The encoder may determine an initial value for $f_v$ (and in turn of $\lambda_v$) in an empirical/statistical manner.

At step 540, at least a portion of the plurality of portions of the content item may be encoded. The encoder may encode at least a portion of the plurality of portions of the content item based on the quantization parameter and the adjustment parameter. For example, the encoder may use the quantization parameter and the adjustment parameter to determine a coding mode associated with a rate-distortion optimization (RDO) cost function minimized by the versatile Lagrangian multiplier that is a function of the quantization parameter and the adjustment parameter. For example, during an RDO process, the encoder may minimize the following cost function:

$$\min\{J(D,R)\}=D+\lambda_v*R$$

where D represents distortion, R represents the bitrate, and $\lambda_v$ represents the versatile Lagrangian multiplier determined from the quantization parameter and the adjustment parameter.

The encoder may modify a frame size of a plurality of frames associated with the at least the portion of the content item. For example, frames may be upsampled and/or downsampled based on the minimization of the cost function. The encoder may modify the frame sizes and allocate, based on the frame size of the plurality of frames, a quantity of bits to the plurality of frames. The quantity of bits may be associated with the bitrate. Modifying the frame size of the plurality of frames associated with the at least the portion of the content item may include determining based on the quantization parameter and the adjustment parameter, a coding mode. Modifying the frame size of the plurality of frames may be based on the coding mode.

Figure 6:
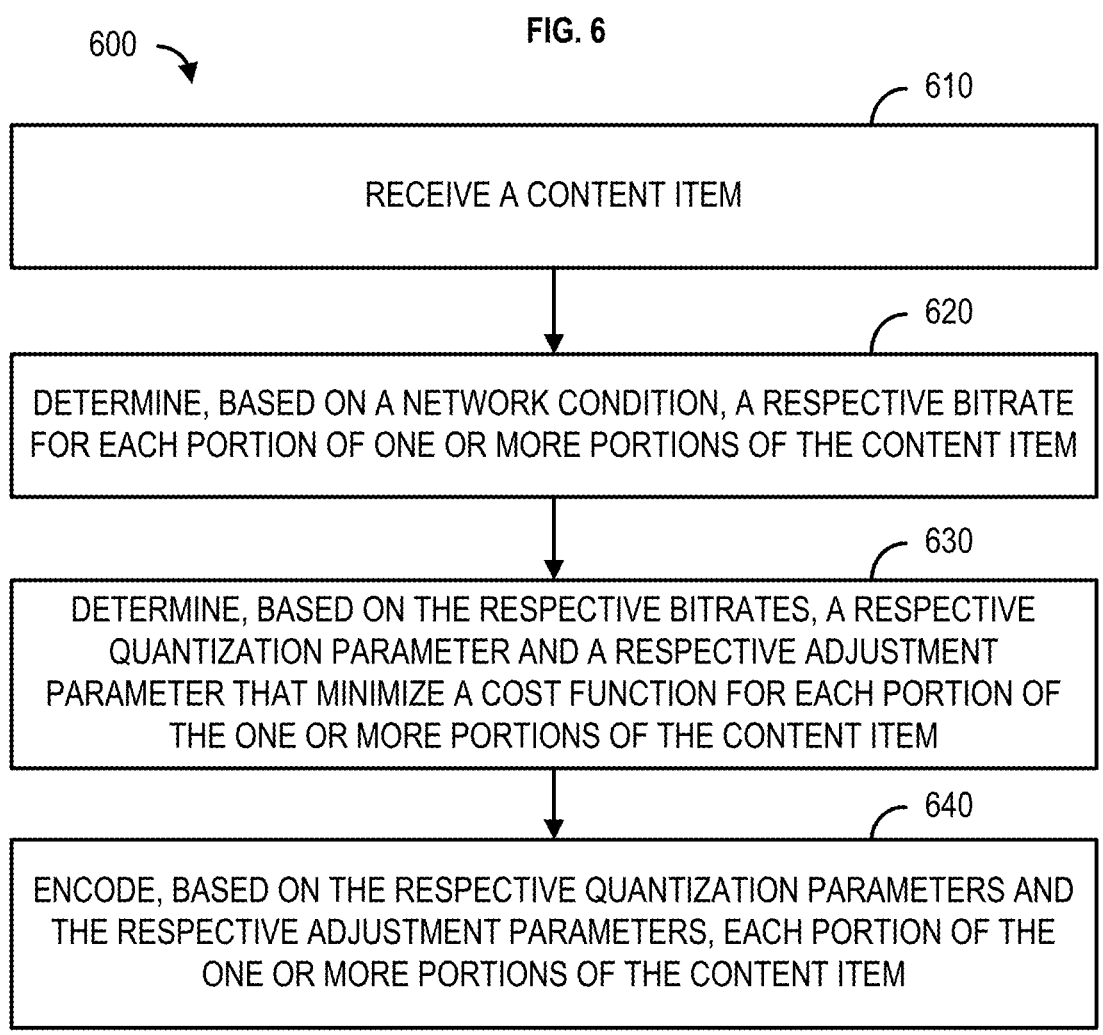
FIG. 6 shows a flowchart of an example method for optimized content encoding.

FIG. 6 is a flowchart of an example method 600 for optimized content encoding (e.g., compression, video processing, etc.). An encoder (e.g., a video encoder, a content encoder, a Versatile Video Coding (VVC) encoder, the encoder 104, etc.) may flexibly and adaptively adjust encoding parameters (e.g., a quantization parameter, an adjustment parameter, etc.) when encoding a content item (e.g., high-resolution video, streaming content, a movie, a show/program, etc.) to allocate (e.g., upsample/upscale, downsample/downscale, etc.) a bitrate to one or more portions (e.g., frames/slices, group of pictures (GOP), coding units (CU), coding tree units (CTU), etc.) of the content item. The encoder may encode one or more portions of the content item at varying bitrates, for example, based on one or more network conditions (e.g., bandwidth, throughput, data loss, etc.), one or more indications/notifications from a user device (e.g., a set-top box, a mobile device, a content player, a smart device, etc.), and/or the like. The encoder, based on a rate-distortion optimization (RDO process) that not only considers quantization, but also accounts for resolution and quality of experience (QoE), and/or the like, may encode one or more portions of the content item at varying bitrates. For example, the encoder may minimize, based on a versatile Lagrangian multiplier that not only considers quantization (a QP parameter), also considers resolution and quality of experience (QoE), minimizes a cost function (e.g., a rate-distortion optimization function, etc.) uses when encoding portions of the content item at varying bitrates without reducing the visual presentation quality of the content item and maintaining an end-user quality of experience (QoE) at an optimal level.

At step 610, a plurality of portions (e.g., frames/slices, group of pictures (GOP), coding units (CU), coding tree units (CTU), etc.) of a content item (e.g., high-resolution video, streaming content, a movie, a show/program, etc.) may be received. The encoder may receive the plurality of portions of the content item. The content item may be a raw, uncompressed content item. The encoder may receive the plurality of portions of the content item from a content source and/or a content item preprocessor. The encoder may receive the plurality of portions of the content item based on a request for the content item from a user device (e.g., a set-top box, a mobile device, a content player, a smart device, etc.). The encoder may send one or more portions of the content item to the user device.

At step 620, bitrates may be determined. The encoder may determine the bitrates. The encoder may determine a respective bitrate for each portion of one or more portions of the plurality of portions of the content item. The encoder may determine the respective bitrates based on a network condition. The network condition may be, for example, an indication of available bandwidth associated with a network, data throughput associated with the network, data loss associated with the network, and/or the like. The indication of the network condition may be received from the user device. For example, an overrun condition and/or underrun condition of a buffer associated with the user device may cause the user device to send the indication of the network condition to the encoder. For example, while a user device is streaming UltraHD/4K resolution video content, an overrun/underrun condition of a buffer may cause the user device to send the indication of the network condition to the encoder. Any network device and/or network component, such as a content server, a content delivery network (CDN) device, a content access device, and/or the like, may send indications of network conditions to the encoder. The encoder may periodically send a signal to any network device and/or network component to determine a condition of the network.

The respective bitrates may be determined based on a compression goal. The compression goal may be to decrease a transmission bitrate, particularly when the content item is streamed UltraHD/4K (and/or 8K) resolution video content, substantially without reducing the visual presentation quality of the content item and keeping an end-user (e.g., the user device, etc.) quality of experience (QoE) at an optimal level. For example, the bitrate may be based on the type of content and/or content item.

At step 630, a respective quantization parameter and a respective adjustment parameter may be determined for each portion of the one or more portions of the content item. The encoder may determine the respective quantization parameters and the respective adjustment parameters. Each of the respective quantization parameters may be, for example, any of 63 quantization parameters. The respective adjustment parameters may be based on and/or indicate at least one of the content resolution and/or playback quality of experience (QoE) associated with each portion of the one or more portions of the content item. The encoder may determine the respective quantization parameters and the respective adjustment parameters for each portion of the one or more portions of the content item based on the respective bitrate. For example, for each portion of the one or more portions of the content item, the encoder may determine a value for the respective quantization parameter and a value for the respective adjustment parameter that causes a respective Langaragian multiplier for each portion of the one or more portions of the content item to minimize a cost function comprising the respective bitrate during a rate-distortion optimization (RDO) process.

For example, for each portion of the one or more portions of the content item, the encoder may use a novel "versatile Lagrangian multiplier" represented as $\lambda_v$ (where the subscript v denotes the versatility of the multiplier). The Lagrangian multiplier $\lambda$ may be more than simply a function of a quantization parameter (QP), and also include and/or account for a respective adjustment parameter associated with resolution (S):

$$\lambda_v(QP|S)=\lambda(QP)*f_s(S)$$

where $f_s$ is a quality factor that has a positive value and depends on the spatial resolution of one or more reference frames (e.g., B-frames) of the respective portion of the content item. The higher the resolution is—the larger its value, and in turn, the larger the value of $\lambda_v$.

The respective Lagrangian multiplier $\lambda_v$ for each portion of the one or more portions of the content item may be more than simply a function of a respective quantization parameter (QP), and also include and/or account for a respective adjustment parameter associated with quality of experience (QoE):

$$\lambda_v(QP|QoE)=\lambda*(1-f_v)$$

where $f_v$ is a quality factor, which may vary between 0 and 1, and can have either a positive or negative value according to a change in the desired/estimated QoE. The encoder may determine the QoE before encoding portions of the content item or in real-time (i.e. during the live streaming) based on different levels of Quality of Service (QoS). For example, different levels of QoS may include an application QoS (e.g., spatial resolution, a given frame rate, objective quality metrics, response time. etc.), a system QoS (e.g., a burst and gap density, etc.), and a network QoS (e.g., a network delay, available bandwidth, packet loss ratio, etc.). The encoder may determine an initial value for $f_v$ (and in turn of $\lambda_v$) in an empirical/statistical manner.

At step 640, each portion of the one or more portions of the content item may be encoded. The encoder may encode each portion of the one or more portions of the content item based on the respective quantization parameters and the respective adjustment parameters. For example, the encoder may use the respective quantization parameter and the respective adjustment parameter for each portion of the one or more portions of the content item to determine a respective coding mode for each portion of the one or more portions of the content item that is associated with a rate-distortion optimization (RDO) cost function minimized by the versatile Lagrangian multiplier that is a function of the respective quantization parameter and the respective adjustment parameter. For example, the encoder may minimize the following cost function:

$$\min\{J_v(D|R)\}=D+\lambda_v*R$$

where D represents distortion, R represents the respective bitrate, and $\lambda_v$ represents the versatile Lagrangian multiplier determined for each portion of the one or more portions of the content item from the respective quantization parameter and the respective adjustment parameter. Using Equations 3 and 4, as previously described, the encoder evaluates the cost function according to each versatile Lagrangian multiplier determined for each portion of the one or more portions of the content item.

The encoder may modify, based on the minimized cost function, a frame size of a respective plurality of frames associated with the respective portion of the content item. For example, frames may be upsampled and/or downsampled based on the cost function. The encoder may allocate based on the frame size of the respective plurality of frames, a quantity of bits to the respective plurality of frames. The quantity of bits may be associated with the respective bitrate.

Figure 7:
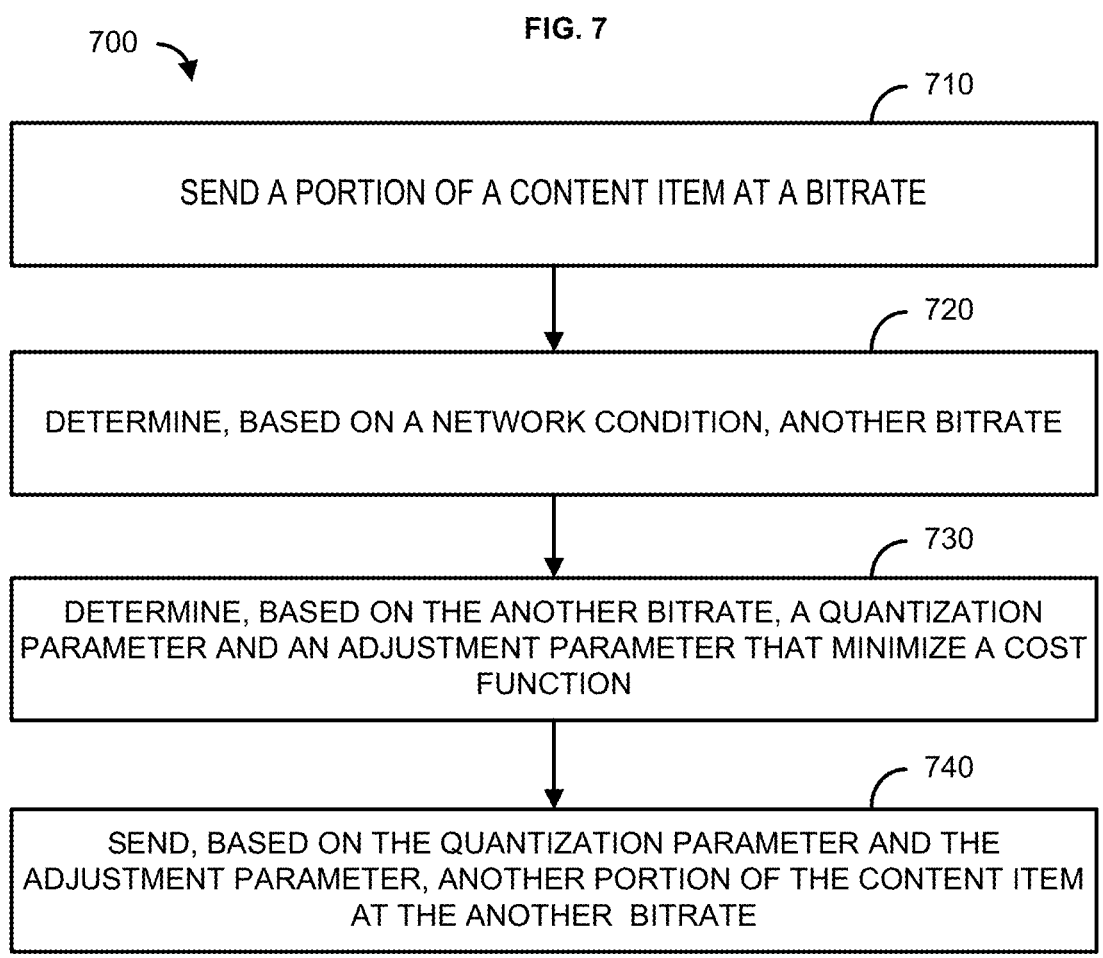
FIG. 7 shows a flowchart of an example method for optimized content encoding.

FIG. 7 is a flowchart of an example method 700 for optimized content encoding (e.g., compression, video processing, etc.). An encoder (e.g., a video encoder, a content encoder, a Versatile Video Coding (VVC) encoder, the encoder 104, etc.) may flexibly and adaptively adjust encoding parameters (e.g., a quantization parameter, an adjustment parameter, etc.) when encoding a content item (e.g., high-resolution video, streaming content, a movie, a show/program, etc.) to allocate (e.g., upsample/upscale, downsample/downscale, etc.) a bitrate to one or more portions (e.g., frames/slices, group of pictures (GOP), coding units (CU), coding tree units (CTU), etc.) of the content item. The encoder may encode one or more portions of the content item at varying bitrates, for example, based on one or more network conditions (e.g., bandwidth, throughput, data loss, etc.), one or more indications/notifications from a user device (e.g., a set-top box, a mobile device, a content player, a smart device, etc.), and/or the like. The encoder, based on a rate-distortion optimization (RDO process) that not only considers quantization, but also accounts for resolution and quality of experience (QoE), and/or the like, may encode one or more portions of the content item at varying bitrates. For example, the encoder may minimize, based on a versatile Lagrangian multiplier that not only considers quantization (a QP parameter), also considers resolution and quality of experience (QoE), minimizes a cost function (e.g., a rate-distortion optimization function, etc.) uses when encoding portions of the content item at varying bitrates without reducing the visual presentation quality of the content item and maintaining an end-user quality of experience (QoE) at an optimal level.

At step 710, a portion of a plurality of portions (e.g., frames/slices, group of pictures (GOP), coding units (CU), coding tree units (CTU), etc.) of a content item (e.g., high-resolution video, streaming content, a movie, a show/program, etc.) may be sent. The encoder may receive the plurality of portions of the content item. The content item may be a raw, uncompressed content item. The encoder may receive the plurality of portions of the content item from a content source and/or a content item preprocessor. The encoder may receive the content item and send the portion of the content item based on a request from a user device (e.g., a set-top box, a mobile device, a content player, a smart device, etc.). For example, the content item may be high-resolution streaming content being sent to the user device. The encoder may send a portion of the content item to the user device at a bitrate.

At step 720, another bitrate may be determined. The encoder may determine another bitrate. The other bitrate may be, based on the portion of the content item sent to the user device, for a next portion of the content item. The encoder may determine the other bitrate measure based on a network condition. The network condition may be, for example, an indication of available bandwidth associated with a network, data throughput associated with the network, data loss associated with the network, and/or the like. The indication of the network condition may be received from the user device. For example, an overrun condition and/or underrun condition of a buffer associated with the user device may cause the user device to send the indication of the network condition to the encoder. For example, while a user device is streaming UltraHD/4K (and/or 8K) resolution video content, an overrun/underrun condition of a buffer may cause the user device to send the indication of the network condition to the encoder. Any network device and/or network component, such as a content server, a CDN network device, a content access device, and/or the like, may send indications of network conditions to the encoder.

The encoder, for example, may determine the other bitrate based on a compression goal. The compression goal may be to decrease the bitrate, particularly when the content item is streamed UltraHD/4K (and/or 8K) resolution video content, substantially without reducing the visual presentation quality of the content item and keeping an end-user (e.g., the user device, etc.) quality of experience (QoE) at an optimal level.

At step 730, a quantization parameter and an adjustment parameter may be determined. The encoder may determine the quantization parameter and the adjustment parameter. The quantization parameter may be any one of 63 quantization parameters. The adjustment parameter may be based on and/or indicate at least one of the content resolution and/or playback quality of experience (QoE) of the content item. The encoder may determine the quantization parameter and the adjustment parameter based on the other bitrate. For example, the encoder may determine a value for the quantization parameter and a value for the adjustment parameter that causes a Langaragian multiplier to minimize a cost function comprising the other bitrate during a rate-distortion optimization process.

For example, the encoder may use a novel "versatile Lagrangian multiplier" represented as $\lambda_v$ (where the subscript v denotes the versatility of the multiplier). The Lagrangian multiplier $\lambda$ may be more than simply a function of a quantization parameter (QP), and also include and/or account for an adjustment parameter associated with resolution (S):

$$\lambda_v(QP|S)=\lambda(QP)*f_s(S)$$

where $f_s$ is a quality factor that has a positive value and depends on the spatial resolution of one or more reference frames (e.g., B-frames) of the portion of the content. The higher the resolution—the larger its value, and in turn, the larger the value of $\lambda_v$.

The Lagrangian multiplier $\lambda_v$ may be more than simply a function of a quantization parameter (QP), and also include and/or account for an adjustment parameter associated with quality of experience (QoE):

$$\lambda_v(QP|QoE)=\lambda*(1-f_v)$$

where $f_v$ is a quality factor, which may vary between 0 and 1, and can have either a positive or negative value according to a change in the desired/estimated QoE. The encoder may determine the QoE before encoding the next portion of the content item (e.g., in real-time, during the live streaming, etc.) based on different levels of Quality of Service (QoS). For example, different levels of QoS may include an application QoS (e.g., spatial resolution, a given frame rate, objective quality metrics, response time. etc.), a system QoS (e.g., a burst and gap density, etc.), and a network QoS (e.g., a network delay, available bandwidth, packet loss ratio, etc.). The encoder may determine an initial value for $f_v$ (and in turn of $\lambda_v$) in an empirical/statistical manner.

At step 740, at least another portion of the plurality of portions of the content item may be sent at the other bitrate. The encoder may send at least another portion of the plurality of portions of the content item at the other bitrate based on the quantization parameter and the adjustment parameter. The encoder may encode at least another portion of the plurality of portions of the content item based on the quantization parameter and the adjustment parameter. For example, the encoder may use the quantization parameter and the adjustment parameter to determine a coding mode associated with a rate-distortion optimization (RDO) cost function minimized by the versatile Lagrangian multiplier that is a function of the quantization parameter and the adjustment parameter. For example, during an RDO process, the encoder may minimize the following cost function:

$$\min\{J(D,R)\}=D+\lambda_v*R$$

where D represents distortion, R represents the target bitrate, and $\lambda_v$ represents the versatile Lagrangian multiplier determined from the quantization parameter and the adjustment parameter.

The encoder may modify a frame size of a plurality of frames associated with the at least the next portion of the content item. For example, frames may be upsampled and/or downsampled based on the minimization of the cost function. The encoder may modify the frame sizes and allocate, based on the frame size of the plurality of frames, a quantity of bits to the plurality of frames. The quantity of bits may be associated with the other bitrate.

Figure 8:
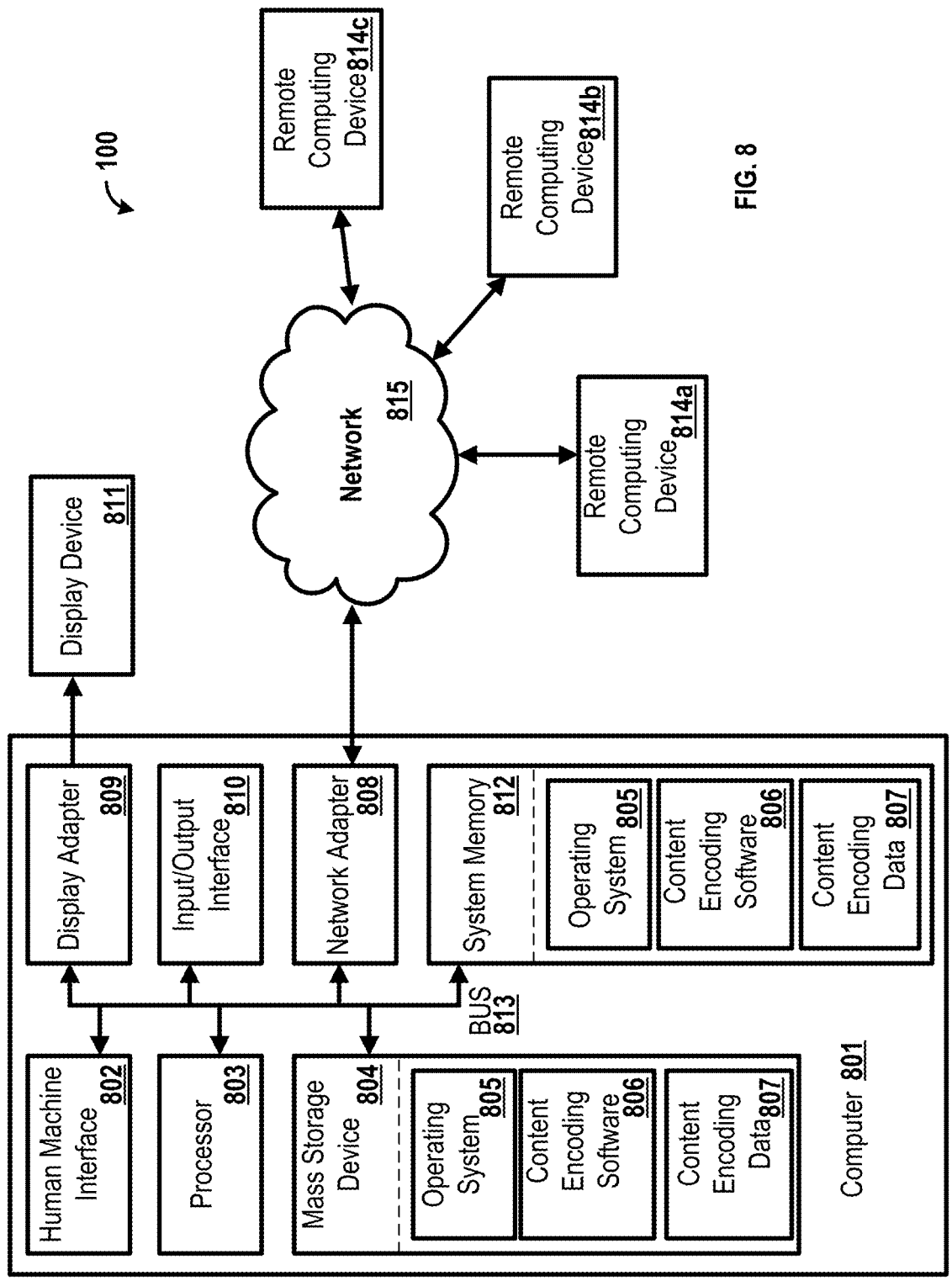
FIG. 8 shows a block diagram of an example computing device for implementing optimized content encoding.

FIG. 8 shows a system 800 for optimized content encoding. Any device and/or component described herein may be a computer 801 as shown in FIG. 8.

The computer 801 may comprise one or more processors 803, a system memory 812, and a bus 813 that couples various components of the computer 801 including the one or more processors 803 to the system memory 812. In the case of multiple processors 803, the computer 801 may utilize parallel computing.

The bus 813 may comprise one or more of several possible types of bus structures, such as a memory bus, memory controller, a peripheral bus, an accelerated graphics port, and a processor or local bus using any of a variety of bus architectures.

The computer 801 may operate on and/or comprise a variety of computer-readable media (e.g., non-transitory). Computer-readable media may be any available media that is accessible by the computer 801 and comprises, non-transitory, volatile and/or non-volatile media, removable and non-removable media. The system memory 812 has computer-readable media in the form of volatile memory, such as random access memory (RAM), and/or non-volatile memory, such as read-only memory (ROM). The system memory 812 may store data such as content encoding data 807 and/or program modules such as operating system 805 and content encoding software 806 that are accessible to and/or are operated on by the one or more processors 803.

The computer 801 may also comprise other removable/non-removable, volatile/non-volatile computer storage media. The mass storage device 804 may provide non-volatile storage of computer code, computer-readable instructions, data structures, program modules, and other data for the computer 801. The mass storage device 804 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any number of program modules may be stored on the mass storage device 804. An operating system 805 and content encoding software 806 may be stored on the mass storage device 804. One or more of the operating system 805 and content encoding software 806 (or some combination thereof) may comprise program modules and the content encoding software 806. Content encoding data 807 may also be stored on the mass storage device 804. Content encoding data 807 may be stored in any of one or more databases known in the art. The databases may be centralized or distributed across multiple locations within the network 815.

A user may enter commands and information into the computer 801 via an input device (not shown). Such input devices comprise but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 803 via a human-machine interface 802 that is coupled to the bus 813, but may be connected by other interface and bus structures, such as a parallel port, game port, an IEEE 1394 Port (also known as a Firewire port), a serial port, network adapter 808, and/or a universal serial bus (USB).

A display device 811 may also be connected to the bus 813 via an interface, such as a display adapter 809. It is contemplated that the computer 801 may have more than one display adapter 809 and the computer 801 may have more than one display device 811. A display device 811 may be a monitor, an LCD (Liquid Crystal Display), light-emitting diode (LED) display, television, smart lens, smart glass, and/or a projector. In addition to the display device 811, other output peripheral devices may comprise components such as speakers (not shown) and a printer (not shown) which may be connected to the computer 801 via Input/Output Interface 810. Any step and/or result of the methods may be output (or caused to be output) in any form to an output device. Such output may be any form of visual representation, including, but not limited to, textual, graphical, animation, audio, tactile, and the like. The display 811 and computer 801 may be part of one device, or separate devices.

The computer 801 may operate in a networked environment using logical connections to one or more remote computing devices 814a, 814b, 814c. A remote computing device 814a, 814b, 814c may be a personal computer, computing station (e.g., workstation), portable computer (e.g., laptop, mobile phone, tablet device), smart device (e.g., smartphone, smartwatch, activity tracker, smart apparel, smart accessory), security and/or monitoring device, a server, a router, a network computer, a peer device, edge device or other common network nodes, and so on. Logical connections between the computer 801 and a remote computing device 814a, 814b, 814c may be made via a network 815, such as a local area network (LAN) and/or a general wide area network (WAN). Such network connections may be through a network adapter 808. A network adapter 808 may be implemented in both wired and wireless environments. Such networking environments are conventional and commonplace in dwellings, offices, enterprise-wide computer networks, intranets, and the Internet.

Application programs and other executable program components such as the operating system 805 are shown herein as discrete blocks, although it is recognized that such programs and components may reside at various times in different storage components of the computing device 801, and are executed by the one or more processors 803 of the computer 801. An implementation of content encoding software 806 may be stored on or sent across some form of computer-readable media. Any of the disclosed methods may be performed by processor-executable instructions embodied on computer-readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
receiving, by a computing device, a first plurality of frames associated with a portion of a content item;
determining, based on an indication of a network condition, a quantization parameter and an adjustment parameter associated with a previously-encoded reference frame, wherein the previously-encoded reference frame is associated with a second plurality of frames of the content item, and wherein the second plurality of frames is associated with a resolution that differs from a resolution associated with the first plurality of frames; and
encoding, based on the quantization parameter and the adjustment parameter, at least one frame of the first plurality of frames, wherein the at least one frame, once encoded, comprises the resolution associated with the second plurality of frames.

2. The method of claim 1, wherein the portion of the content item comprises at least one of: a slice, a group of pictures (GOP), a coding unit (CU), or coding and a coding tree unit (CTU).

3. The method of claim 1, wherein the content item comprises streaming video content.

4. The method of claim 1, wherein the network condition is associated with at least one of: network bandwidth, data throughput, and data loss.

5. The method of claim 1, further comprising receiving the indication of the network condition from a user device.

6. The method of claim 1, wherein the indication of the network condition is based on at least one of: an overflow condition of a buffer associated with a user device, or an underflow condition of the buffer.

7. The method of claim 1, wherein determining the quantization parameter and the adjustment parameter is based on rate-distortion optimization.

8. The method of claim 1, wherein the quantization parameter is one of 63 different quantization parameters.

9. The method of claim 1, wherein the adjustment parameter is associated with at least one of: content resolution or playback quality of experience (QoE).

10. The method of claim 1, wherein determining, based on the indication of the network condition, the quantization parameter and the adjustment parameter associated with the previously-encoded reference frame comprises determining a value for the quantization parameter and a value for the adjustment parameter that causes a multiplier to minimize a cost function associated with a bitrate associated with the network condition.

11. The method of claim 1, wherein encoding, based on the quantization parameter and the adjustment parameter, the at least one frame of the first plurality of frames comprises:
modifying, based on the quantization parameter and the adjustment parameter, a frame size of each frame of the first plurality of frames; and
allocating, based on the modified frame size of each frame of the first plurality of frames, a quantity of bits to the first plurality of frames, wherein the quantity of bits is associated with a bitrate associated with the network condition.

12. The method of claim 11, wherein modifying, based on the quantization parameter and the adjustment parameter, the frame size of each frame of the first plurality of frames comprises:
determining, based on the quantization parameter and the adjustment parameter, a coding mode; and
modifying, based on the coding mode, the frame size of each frame of the first plurality of frames.

13. The method of claim 11, further comprising sending the first plurality of frames associated with the portion of the content item at the bitrate.

14. A method comprising:
receiving, by a computing device, a first plurality of frames associated with a plurality of portions of a content item;
determining, based on an indication of a network condition, for each portion of one or more portions of the plurality of portions of the content item, a respective quantization parameter and a respective adjustment parameter associated with a previously-encoded respective reference frame, wherein the previously-encoded respective reference frame is associated with a second plurality of frames of the content item, and wherein the second plurality of frames is associated with a resolution that differs from a resolution associated with the respective first plurality of frames associated with each portion of the one or more portions; and
encoding, based on the respective quantization parameters and the respective adjustment parameters, at least one respective frame of the respective first plurality of frames associated with each portion of the one or more portions of the content item, wherein the at least one respective frame, once encoded, comprises the resolution associated with the second plurality of frames.

15. The method of claim 14, wherein each portion of the plurality of portions of the content item comprises at least one of: a slice, a group of pictures (GOP), a coding unit (CU), or coding and a coding tree unit (CTU).

16. The method of claim 14, further comprising receiving the indication of the network condition from a user device.

17. The method of claim 14, wherein the indication of the network condition is based on at least one of an overflow condition of a buffer associated with a user device, or an underflow condition of the buffer.

18. The method of claim 14, wherein encoding, based on the respective quantization parameters and the respective adjustment parameters, the at least one respective frame of the respective first plurality of frames associated with each portion of the one or more portions of the content item comprises:
modifying, based on the respective quantization parameters and the respective adjustment parameters, a frame size of each respective frame of the respective first plurality of frames associated with each portion of the one or more portions of the content item; and
allocating, based on the modified frame size of each respective frame of the respective first plurality of frames, a quantity of bits to the respective first plurality of frames, wherein the quantity of bits is associated with the respective bitrate.

19. The method of claim 18, wherein modifying, based on the respective quantization parameters and the respective adjustment parameters, the frame size of each respective frame of the respective plurality of frames associated with each portion of the one or more portions of the content item comprises:
determining, based on the respective quantization parameters and the respective adjustment parameters, a coding mode; and
modifying, based on the coding mode, the frame size of each respective frame of the respective plurality of frames.

20. A method comprising:
sending, to a user device, at least a first frame of a first plurality of frames associated with a portion of a content item at a first bitrate;
determining, based on an indication of a network condition, a quantization parameter and an adjustment parameter associated with a previously-encoded reference frame, wherein the previously-encoded reference frame is associated with a second plurality of frames of the content item, and wherein the second plurality of frames is associated with a resolution that differs from a resolution associated with the first plurality of frames; and
sending, based on the quantization parameter and the adjustment parameter, a second frame of the first plurality of frames, wherein the second frame, once encoded, comprises the resolution associated with the second plurality of frames.

21. The method of claim 1, wherein the previously-encoded reference frame comprises a B-frame.

22. The method of claim 14, wherein the respective previously-encoded reference frame comprises a respective B-frame.

23. The method of claim 20, wherein the previously-encoded reference frame comprises a B-frame.

* * * * *